(12) United States Patent
Wong et al.

(10) Patent No.: US 10,320,633 B1
(45) Date of Patent: Jun. 11, 2019

(54) INSIGHTS FOR WEB SERVICE PROVIDERS

(71) Applicant: BloomReach Inc., Mountain View, CA (US)

(72) Inventors: Wai Hung Wong, Mountain View, CA (US); Nishant Deshpande, Mountain View, CA (US); Pradeep Muthukrishnan, Mountain View, CA (US); Vaibhav Avinash Chidrewar, Sunnyvale, CA (US); Charlie Luo, Mountain View, CA (US); Rahul Bhandari, San Mateo, CA (US); Ashutosh Garg, Sunnyvale, CA (US)

(73) Assignee: BloomReach Inc., Mountain View, CA (US)

( * ) Notice: Subject to any disclaimer, the term of this patent is extended or adjusted under 35 U.S.C. 154(b) by 493 days.

(21) Appl. No.: 14/733,800

(22) Filed: Jun. 8, 2015

Related U.S. Application Data

(60) Provisional application No. 62/082,524, filed on Nov. 20, 2014.

(51) Int. Cl.
*H04L 12/26* (2006.01)
*H04L 29/08* (2006.01)

(52) U.S. Cl.
CPC .............. *H04L 43/06* (2013.01); *H04L 43/08* (2013.01); *H04L 67/22* (2013.01)

(58) Field of Classification Search
CPC .......... H04L 43/06; H04L 43/08; H04L 67/42
USPC ....................................................... 709/224
See application file for complete search history.

(56) References Cited

U.S. PATENT DOCUMENTS

| | | | |
|---|---|---|---|
| 5,584,024 A * | 12/1996 | Shwartz | G06F 17/30392 |
| 5,727,129 A | 3/1998 | Barrett et al. | |
| 6,182,068 B1 | 1/2001 | Culliss | |
| 6,327,590 B1 | 12/2001 | Chidlovskii et al. | |
| 8,095,582 B2 | 1/2012 | Cramer | |
| 8,255,280 B1 * | 8/2012 | Kay | G06F 21/53 |
| | | | 705/26.1 |
| 8,442,973 B2 | 5/2013 | Cramer et al. | |

(Continued)

FOREIGN PATENT DOCUMENTS

| | | |
|---|---|---|
| EP | 1492032 | 6/2004 |
| WO | 2014113396 | 7/2014 |

OTHER PUBLICATIONS

Karande et al., Natural language Database Interface for Selection of Data Using Grammar and Parsing, World Academy of Science, Engineering and Technology, 2009.

(Continued)

*Primary Examiner* — Tauqir Hussain
*Assistant Examiner* — Jsing Forng Lin
(74) *Attorney, Agent, or Firm* — Moser Taboada

(57) ABSTRACT

Techniques for providing insights for web service providers are disclosed. In some embodiments, a system, process, and/or computer program product for providing insights for web service providers includes monitoring user activities on a web site; generating a dashboard for displaying a summary of the monitored user activities on the web site; and generating a recommendation for improving performance of the web site for display on the dashboard. For example, the recommendation can be for improving performance of search results on the web site and/or for improving content navigation on the web site.

16 Claims, 22 Drawing Sheets

(56) References Cited

U.S. PATENT DOCUMENTS

| | | | |
|---|---|---|---|
| 8,645,212 B2 | 2/2014 | Urban | |
| 8,667,584 B2 | 3/2014 | Berg et al. | |
| 2002/0198882 A1* | 12/2002 | Linden | G06F 17/30867 |
| 2006/0064411 A1* | 3/2006 | Gross | G06F 17/30864 |
| 2006/0161520 A1 | 7/2006 | Brewer et al. | |
| 2009/0125976 A1* | 5/2009 | Wassermann | G06F 11/3688 726/1 |
| 2010/0036828 A1* | 2/2010 | Carmel | G06F 17/30722 707/708 |
| 2010/0161400 A1* | 6/2010 | Snodgrass | G06Q 30/02 705/14.16 |
| 2011/0010307 A1* | 1/2011 | Bates | G06Q 30/02 705/347 |
| 2011/0088023 A1 | 4/2011 | Haviv et al. | |
| 2012/0158685 A1 | 6/2012 | White et al. | |
| 2012/0221411 A1 | 8/2012 | Graham, Jr. et al. | |
| 2012/0221931 A1 | 8/2012 | Gleadall et al. | |
| 2012/0310684 A1* | 12/2012 | Carter | G06Q 10/067 705/7.11 |
| 2012/0323682 A1* | 12/2012 | Shanbhag | G06Q 30/0641 705/14.51 |
| 2014/0195512 A1 | 7/2014 | Ramachandra et al. | |

OTHER PUBLICATIONS

Bird et al., Extending XPath to Support Linguistic Queries, University of Pennsylvania, ScholarlyCommons, Department of Computer & Information Science, Jan. 11, 2015.

Rao et al., Natural Language Query Processing Using Semantic Grammar, International Journal on Computer Science and Engineering, vol. 02, No. 02, 2010, pp. 219-223.

Devale et al., Probabilistic Context Free Grammar: an Approach to Generic Interactive Natural Language Interface to Databases, Journal of Information, Knowledge and Research in Computer Engineering, Nov. 2010 to Oct. 2011, vol. 01, Issue 02, pp. 52-58.

* cited by examiner

FIG. 8

| Customer ID | State | Revenue |
|---|---|---|
| 1 | California | $100 |
| 2 | California | $150 |
| 3 | Washington | $120 |

INSIGHTS FOR WEB SERVICE PROVIDERS

CROSS REFERENCE TO OTHER APPLICATIONS

This application claims priority to U.S. Provisional Patent Application No. 62/082,524, entitled INSIGHTS FOR WEB SERVICE PROVIDERS filed Nov. 20, 2014 which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Internet-based web services can be delivered through web sites on the World Wide Web. Web pages are often formatted using HyperText Markup Language (HTML), eXtensible HTML (XHTML), or using another language that can be processed by a web browser that is typically executed on a user's client device, such as a computer, tablet, phablet, smart phone, smart watch, smart television, or other (client) device. A web site can be hosted on a web server (e.g., a web server or appliance) that is typically accessible via a network, such as the Internet, through a web address, which is generally known as a Uniform Resource Indicator (URI) or a Uniform Resource Locator (URL).

For improved Internet-based web services, search engine optimization (SEO) has developed as a form of industry/technical consulting (e.g., often referred to as search engine optimizers) provided to web site operators (e.g., vendors of products/services with web sites and/or e-commerce vendors of products/services) for improving the volume or quality of traffic to a web site from a search engine via organic search results (e.g., to improve the web site's web presence as a paid service engagement or pursuant to a marketing campaign). Generally, the higher a web site appears in the organic search results list, the more users it will receive from the search engine. SEO can target different kinds of searches, including image search, local search, and industry specific, vertical search engines to improve the web site's web presence. For example, SEO often considers how search engines work and what people search for to recommend web site related changes to optimize a web site (e.g., which primarily involves editing its content and HTML coding to both increase its relevance to specific keywords and to remove barriers to the indexing activities of search engines).

BRIEF DESCRIPTION OF THE DRAWINGS

Various embodiments of the invention are disclosed in the following detailed description and the accompanying drawings.

FIG. 8 is a screen diagram illustrating a user interface for viewing past actions and tracking their performance generated by the insights for web service providers system in accordance with some embodiments.

FIG. 11 is an example table that lists customers and their geographic locations along with the revenue from each customer.

DETAILED DESCRIPTION

Figure 1:
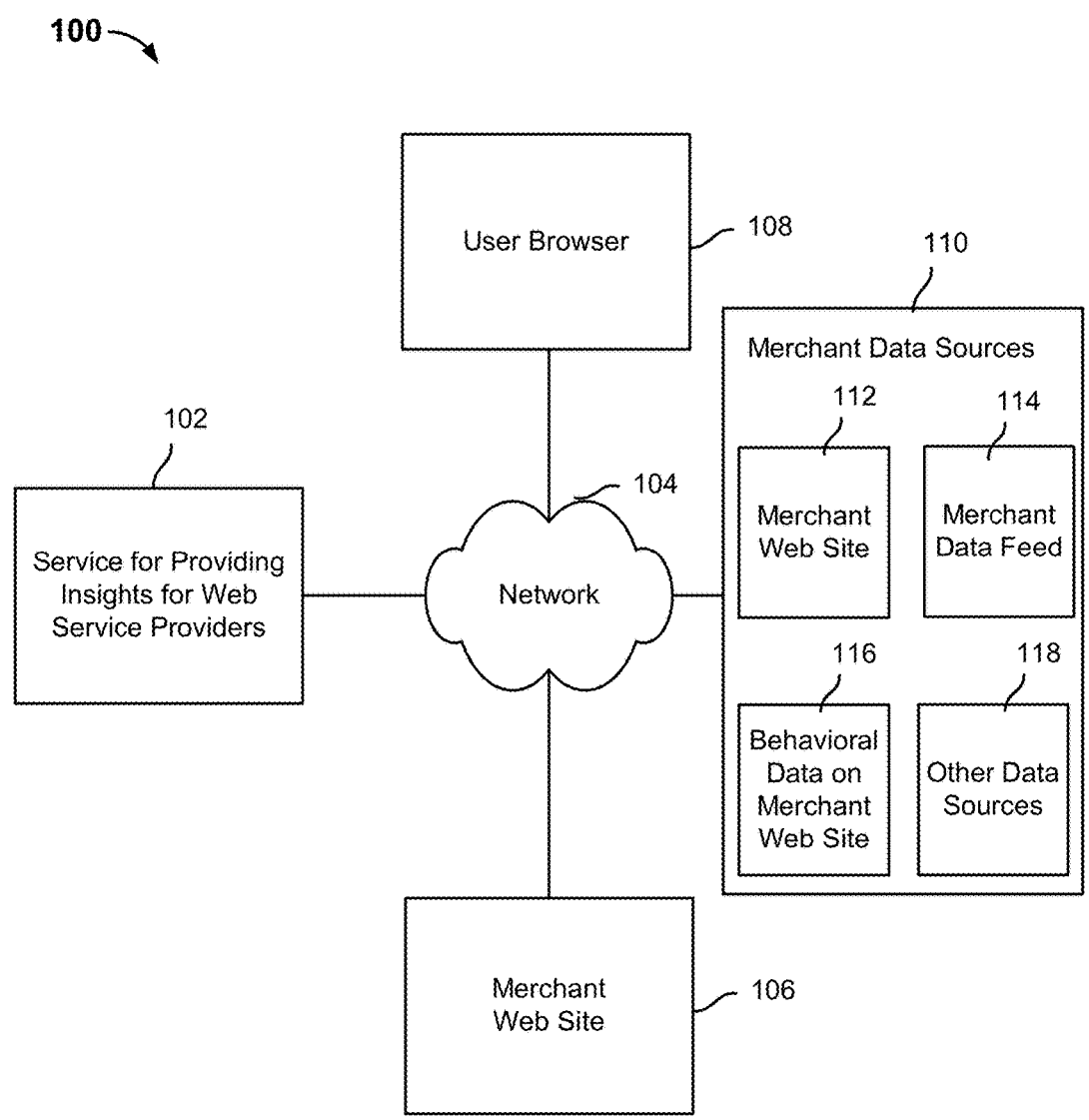
FIG. 1 is a functional block diagram illustrating a network architecture of a service for providing insights for web service providers in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet-based web services can be delivered through web sites on the World Wide Web (WWW). Web pages are often formatted using HyperText Markup Language (HTML), eXtensible HTML (XHTML), or using another markup and/or programming language that can be processed by a web browser that is typically executed on a user's client device, such as a computer, tablet, phablet, smart phone, smart watch, smart television, or other (client) device (e.g., a user computing device). A web site can be hosted on a server (e.g., a web server/appliance and/or an application server/appliance) that is typically accessible via a network, such as the Internet, through a web address, which is generally known as a Uniform Resource Indicator (URI) or a Uniform Resource Locator (URL).

Web sites can generally be classified as static web sites or interactive web sites. Static web sites and interactive web sites are generally described below.

Static web sites generally include static web content. For example, a web site can include one or more static web pages stored on a web server. Such static web pages are basically delivered to a client web browser in the same format that such web pages are stored on the web server (e.g., the same content is presented to each user that navigates to that particular static web page, which provides a consistent presentation of the static content on that web page to each of the different users/visitors of that web page). Static web pages are typically coded in a markup language, such as HTML, and style sheets, such as Cascading Style Sheets (CSS), are also often used to control the appearance or style of such basic HTML web pages. Static content on a static web site is typically manually updated. For example, a web page editor or other tools can be used by a web site owner to edit the static content on a web page (e.g., editing, adding, or deleting text, photos, and/or other content on the web page).

Interactive web sites (e.g., also referred to as dynamic web sites) generally include dynamic web content (e.g., typically dynamic content can be included along with or in addition to various static content on a web site). Specifically, an interactive or dynamic web site generally includes one or more dynamic web pages (e.g., web pages with dynamic content, such as by providing one or more dynamic elements on a web page). In some cases, a dynamic web page can refer to a web page that can change or customize automatically (e.g., to change over time and/or to present different content to different users to personalize web content for different users, etc.). For example, a dynamic web page can be provided using client-side dynamic web pages that are coded, for example, using JavaScript (e.g., or another programming/scripting language, such as Java, Python, and/or other general programming languages) to implement a dynamic web page (e.g., a dynamic HTML web page) that provides instructions to a user's web browser on how to interactively modify content of the web page (e.g., to personalize the content of the web page for a given user or provide other dynamic content for the web page). As another example, dynamic web pages can also be provided using server-side dynamic web pages that are generated automatically (e.g., on the fly) by computer code executed on a server (e.g., a web server or application server) to provide, for example, the HTML and CSS for the dynamically generated content for the web page. Dynamic web pages can generally be implemented using various software platforms/tools (e.g., Java Server Pages, Active Server Pages, HTML forms, and/or other software platforms/tools) and/or using various web application frameworks and web template systems that use general programming languages (e.g., Java, Python, and/or other general programming languages) to facilitate the implementation of dynamic web content for interactive or dynamic web sites.

An e-commerce web site generally refers to a web site that allows users to purchase products or services through the web site (e.g., to facilitate Internet-based web services). E-commerce web sites often include both static and dynamic content on their web sites.

A merchant as used herein generally refers to a third party entity that uses a web site (e.g., on the World Wide Web (WWW)) to engage with customers and/or to buy and sell products and/or services. A merchant web site as used herein generally refers to a web site, such as an e-commerce web site, provided by/for the merchant that facilitates the merchant's online WWW presence to engage with customers and/or to buy and sell products and/or services (e.g., for performing e-commerce on the WWW, such as an e-commerce site that offers products/services for sale, an online news web site that presents news content as an online/web service, and/or a social networking site that provides social networking as an online/web service). Merchant web sites often include both static and dynamic content on their web sites.

Web sites, such as merchant web sites or e-commerce web sites, can include a variety of different static and/or dynamic web page content. The quality of such web content is important to provide an effective web site for users and, therefore, an effective online WWW presence for merchants using e-commerce/merchant web sites to interact with customers and/or potential customers. For example, a merchant web site should generally provide access to content in a manner that is effectively presented to users and facilitates user access and navigation on the merchant web site.

Web sites (e.g., web applications and/or various other web services delivered through web sites) generally store and display content (e.g., products or services related content in the case of a retailer, such as an e-commerce site; various informational related content in the case of a publisher, such as an online news or online magazine site; and/or various other content for other types of merchant sites). For example, this content can be accessed by a user in two primary ways: (1) an internal site search approach; and (2) a non-search approach (e.g., browse and/or site navigation, such as content/category navigation). Web site providers (e.g., for merchant/e-commerce sites) generally attempt to maintain a web site that performs well by providing users (e.g., visitors) of the web site efficient and accurate access to content on the web site through site search and/or content/category navigation.

However, maintaining a web site that performs well by providing users (e.g., visitors) of the web site efficient and accurate access to content on the web site through site search and/or content/category navigation is increasingly challenging as the rate of data generation related to web site activities and/or content has rapidly increased over the last decade. Driven by increases in processing power, Information Technology (IT) investments that record more data about each user, and declining costs of storage, business users who have to make decisions have a significantly increasing amount of data available yet such data is not accessible to them without the assistance of various different IT personnel/experts and/or analytics personnel/experts. For example, accessing and understanding the data often requires an analyst who is specially trained in the company's IT infrastructure to spend hours, days, or weeks analyzing the data. This means the ability to react to quick changes is compromised and the number of actions and results gleaned from the data is often limited as well. For example, given the volume of web site traffic/activity related data, it can be difficult to access the data by the persons who need to apply the data to improve web site performance.

Furthermore, even if a web site operator (e.g., web service provider) were to invest in additional analysts, the pace of growth of data generally means that it is very difficult for humans to continuously review this data. So much data is often being recorded and stored that it would be very difficult for a human to keep up in an error-free, scalable way to timely identify anomalies in the data. For example, given the volume of web site traffic/activity related data, it can be difficult to identify anomalies and/or opportunities in the data (e.g., an anomaly can be an identification of a pattern that many users are leaving the web site on a given web page, and then determining what is the problem that needs to be fixed on the web site so that so many users do not leave the web site on that given web page).

In addition, once a user (e.g., IT personnel or analyst(s)) comes up with a recommended plan of action based on the data, it is often difficult to determine the impact of that action. For example, it can be a significant investment of time and money to configure tracking to report for each change made to a web site so that the user can determine if the action had the intended/desired impact on the performance of the web site.

Another existing problem confronting web service providers is that data that can be used to analyze web site performance is often stored in disjoint, separate data stores. For example, web sites often use structured data stores for storing structured data (e.g., product inventory data, etc.) and also use unstructured data stores for storing unstructured data (e.g., content for the web site, such as text, pictures, etc.).

However, it is generally difficult to join and combine structured data with unstructured data. For example, a merchant may want to perform a query to determine how all web pages on the merchant's web site that have the word "fall boots" perform versus web pages that have "winter boots." This would generally require an unstructured search over the web site's content and then an aggregation on the performance of each of those pieces of content, which is difficult to perform at scale using existing approaches.

In particular, in the existing world of web analytics and web site operations, users often deal with disjointed stores and forms/types of data. For example, users might have a data store (e.g., stored in a structured database) of their web analytics data (e.g., behavior data, also referred to as pixel log data or pixel data) and a separate Content Management Store (CMS) (e.g., stored in an unstructured data store, which is indexed for performing an unstructured search of the content stored in the CMS) that stores what content is displayed in their web site. A web service provider (e.g., online/e-commerce merchant with one or more web sites) can have a separate database storing inventory and product level information. Disparate systems that do not communicate/interface with each other can, thus, make it difficult to find opportunities that can be more effectively and more efficiently determined if all the data is available in one place. For example, what are the high inventory items that are missing from presentation on the merchant's web site can be more effectively and more efficiently determined if these two disjoint/separate databases were joined and/or searchable using a single query (e.g., of the web analytics data and the content and/or product data). Further, traditional joins of these databases are often inadequate to interpret the data and a significant level of noise through behavior signals generally would need to be cleaned up to make sense of the data.

Thus, there is a need for new and improved techniques for providing insights for web service providers.

Overview of Techniques for Providing Insights for Web Service Providers

Accordingly, techniques for providing insights for web service providers are disclosed. For example, the insights for web service providers can identify and prioritize opportunities for improving performance of web sites provided by the web service providers, as further described below. As another example, the insights for web service providers can facilitate an improvement in performance of web sites provided by the web service providers, such as enhanced searches on the web site, enhanced content on content web pages of the web site, and/or enhanced content/category navigation on the web site, as further described below.

In some embodiments, a system, process, and/or computer program product for providing insights for web service providers includes monitoring user activities on a web site; generating a dashboard for displaying a summary of the monitored user activities on the web site; and generating a recommendation for improving performance of the web site (e.g., a merchant web site or other type of web site) for display on the dashboard. For example, the recommendation can be for improving performance of search results on the web site (e.g., site search) and/or for improving content navigation on the web site (e.g., and/or for improving content on one or more content web pages of the web site). The dashboard can be displayed via a web site.

In one embodiment, the system, process, and/or computer program product for providing insights for web service providers further includes monitoring a plurality of behavior signals based on user activity on the web site. For example, the plurality of behavior signals can be monitored to identify recommendations and/or opportunities to improve performance of the web site (e.g., to optimize performance of a merchant web site or other type of web site), such as to enhance search pages, search terms for searching on the web site, and/or to enhance content navigation/category pages on the web site based on an understanding of entity relationships based on co-visit analysis techniques (e.g., a co-visit association algorithm), such as further described below.

In one embodiment, the system, process, and/or computer program product for providing insights for web service providers further includes monitoring a modification to the web site to track performance of the web site based on the modification to the web site. For example, if a recommended change related to a search result and/or a content navigation page on the web site is implemented, then the web site performance associated with the implemented change can be monitored to provide a feedback loop/verification to determine whether the implemented change improved the performance of the web site. The web site performance associated with the implemented change can be displayed in a dashboard (e.g., a dashboard/report or other interface to track and measure the impact of any changes/modifications to the web site). As another example, the performance of the web site can be monitored over time and displayed in the dashboard.

In one embodiment, the system, process, and/or computer program product for providing insights for web service providers further includes determining a user intent based on monitored user activities prior to a search on the web site (e.g., a visitor performed site search on the merchant web site) and after a search on the web site based on a user query; associating the user intent based on the monitored user activities prior to the search on the web site and after the search on the web site with the user query; and determining a search result that is not relevant to the user intent based on the monitored user activities prior to the search on the web site and after the search on the web site. For example, performance of site search on the web site can be improved using these techniques by further determining an understanding of entity relationships based on co-visit analysis techniques (e.g., a co-visit association algorithm), such as further described below.

In some embodiments, a system, process, and/or computer program product for providing insights for web service providers includes monitoring user activities on a web site prior to a search on the web site based on a user query; monitoring user activities on a web site after the search on the web site based on the user query; and generating a recommendation for improving performance of the web site based on the monitored user activities prior to the search and after the search on the web site. For example, the recommendation can be generated for improving performance of search results on the web site based on the user query.

In one embodiment, the system, process, and/or computer program product for providing insights for web service providers further includes determining a user intent based on the monitored user activities prior to the search and after the search on the web site; associating the user intent based on the monitored user activities prior to the search and after the search on the web site with the user query; and determining a search result that is not relevant to the user intent based on the monitored user activities prior to the search and after the search on the web site.

In some embodiments, a system, process, and/or computer program product for providing insights for web service providers includes receiving a user query for web site performance data; translating the user query for the web site performance data into a programmed query; and returning the web site performance data based on the programmed query in response to the user query. For example, the user query can be translated from a natural language user query into a structured query (e.g., a Structured Query Language (SQL) query) using a Context Free Grammar (CFG) specification.

In one embodiment, the system, process, and/or computer program product for providing insights for web service providers further includes generating an autosuggest query for the web site performance data based on the user query; and displaying the autosuggest query for the web site performance data based on the user query.

In one embodiment, the system, process, and/or computer program product for providing insights for web service providers further includes generating a structured query for the web site performance data based on the user query (e.g., in which the user query is an unstructured query). For example, the structured query for the web site performance data based on the user query can be used to query the web site performance data stored in a structured set of data (e.g., product revenue data, product catalog/product feed data, and/or other web site/performance related data can be stored in a structured data store), and the unstructured query for the web site performance data based on the user query can be used to query the web site performance data stored in an unstructured set of data (e.g., content for the web site, such as the CMS and/or other web site/performance related data, can be stored in an unstructured data store).

In an example implementation, a service for providing insights for web service providers can be delivered by a third-party outsource/service provider as insights for web service providers service, such as described herein.

As further described below, these and various other features and techniques are disclosed for providing insights for web service providers to enhance online web services (e.g., Internet-based web services), such as for web sites (e.g., e-commerce/merchant sites and/or other types of web sites).

Overview of a Service for Providing Insights for Web Service Providers

FIG. 1 is a functional block diagram illustrating a network architecture of a service for providing insights for web service providers in accordance with some embodiments. FIG. 1 provides an exemplary network architecture 100 for providing insights for web service providers that can be implemented using various computing hardware and performing various processes executed on computing hardware as will be further described below.

Referring to FIG. 1, a service for providing insights for web service providers 102 is shown in communication with a network 104, such as the Internet. Service for providing insights for web service providers 102 is in communication with one or more web sites (e.g., e-commerce/merchant sites and/or other sites), such as a merchant web site 106 as shown. Merchant web site 106 can be in communication via network 104 with one or more user browsers, such as a user browser 108 as shown (e.g., a web browser, such as Apple Safari®, Google Chrome®, Microsoft Internet Explorer®, or another web browser, which can be executed on a user client device, such as a laptop/desktop computer, tablet, smart phone, smart watch, or another client device capable of Internet/WWW access). Service for providing insights for web service providers 102 is also in communication with various data sources (e.g., merchant web services related data sources) via network 104, such as further described below.

As also shown in FIG. 1, data sources include various web site related data sources, shown as merchant data sources 110. As shown, merchant data sources 110 can include a merchant web site 112 (e.g., a corpus of web pages, such as one or more web pages that are published on the merchant's web site 106, which can be captured using web crawling techniques to periodically crawl web pages of merchant web site 106, such as further described below), a merchant content data feed 114 (e.g., a merchant product data feed and/or other merchant content data feed, such as further described below with respect to various embodiments), behavioral data on the merchant web site 116 (e.g., user behavior on merchant web site 106 can be captured using pixel log data techniques, such as further described below), and various other data sources 118 (e.g., various other web data sources including a site map of the web site, web server/API logs, as well as various other potential web related data sources, such as search logs, social media data sources, electronic mail data sources, browsing history data sources, and/or other data sources can be provided).

As will now be apparent to one of ordinary skill in the art, similar web services related data for a plurality of different web sites (e.g., different e-commerce/merchant web sites and/or other types of web sites) can be provided to facilitate the service for providing insights for web service providers 102 implemented as, for example, a cloud service for enhancing performance of merchant web sites and/or other web sites by applying the disclosed techniques for providing insights for web services (e.g., a subscription service for the service for providing insights for web service providers for merchant/e-commerce web sites, which can be implemented as a cloud service), such as further described herein.

In an example implementation, service for providing insights for web service providers 102 is in communication with each of the merchant data sources, such as shown in FIG. 1, to receive or collect merchant web site data, merchant data feeds, behavior data on the merchant web sites, and/or other data sources for each of the one or more merchants. For example, merchants can subscribe to the service for providing insights for web service providers 102 implemented as a cloud service for enhancing performance of merchant web sites and/or other web sites (e.g., in which the cloud service can be implemented using a cloud service provider, such as using Amazon Web Services™ (AWS) or other cloud service data center providers, such as further described below).

In one embodiment, the above-described data sources (e.g., data sources 110 such as for a given merchant and/or other data sources for other merchants) can be processed using various techniques as described below. For example, a web site content crawling process can be performed (e.g., implemented using a web site content crawler/site fetcher) to periodically crawl and fetch web pages on a target web site (e.g., to periodically crawl and fetch web pages on a subscribing merchant web site 106, and also shown as a data source, merchant web site 112 of merchant data sources 110). The content (e.g., HTML content, dynamic content such as Java Script content, and/or other content) can be fetched from the merchant web site, and the web site content (e.g., of each crawled and fetched web page of the web site) can then be parsed, stored, and analyzed using the disclosed techniques (e.g., using a web page parser), such as further described below. As another example, in some cases, a merchant data feed retrieving process can be performed (e.g., implemented using a merchant data feed retrieving engine) to retrieve merchant content/product data feeds (e.g., merchant data feed 114) and parse product attributes, such as title, heading, description, and/or price. In some cases, a merchant data feed can be used to analyze whether content in a merchant content/product data feed is accessible via the merchant web site as an example measure of performance related to content on the web site using the disclosed techniques, such as further described below. As yet another example, a behavior data collection process can be performed (e.g., implemented using a behavioral data collection engine) using pixel data on a merchant's web site. Using this approach, when a user visits a web page of a given merchant's web site, then dynamic content (e.g., Java Script code or other dynamic code/content) on the web page generates a pixel request to the merchant data sources (e.g., a server that is provided for capturing behavioral data on the merchant web site, such as shown as merchant data sources 110) that includes, for example, a machine IP (e.g., the IP address associated with the user's device), a user ID (optional), a referrer URL (e.g., the URL of the web page that preceded the web page in question), a web page URL, and/or other information (optional). In this example, raw pixel data can then be provided from each of the merchants (e.g., shown as behavioral data 116 for merchant web site 106). Each of the data sources is described in more detail below in accordance with various embodiments.

As similarly described above, a continuous process can be performed to crawl and fetch pages from a subscribing web site (e.g., implemented using a web site crawler component, which can be implemented to perform crawling and fetching operations as described herein). For example, the crawling and fetching operation can receive as input a list of URLs on a merchant web site and fetch the content of each such web page (e.g., HTML and/or other content on each of the fetched web pages). As further described below, the content of a fetched web page can then be parsed by applying various parsing rules (e.g., implemented using a parser component) configured for web pages (e.g., manually configured for a particular merchant's web pages or using a default configuration for parsing typical merchant web pages). For example, the parser operation can parse each page to extract various elements and/or content related attributes, such as further described below. As such, content published on a merchant's web site can be fetched and parsed, and the merchant's web site content can then be used for performing the disclosed techniques for providing insights for web service providers as further described below.

In some cases, a process can also be performed to retrieve merchant content/product data feeds for each of the merchants (e.g., implemented using a merchant data feed retriever component as disclosed herein). In an example implementation, the merchant can either provide a location to fetch the merchant data feed or upload the merchant data feed to a location specified for retrieving (e.g., pulling) the merchant data feed (e.g., periodically or upon demand). For example, the merchant data feed can be provided as a file (e.g., in a format that can be parsed, such as in an XML or other file format that provides a (subset) view of, for example, a merchant's product/service catalog, such as by providing incremental updates to product catalog information using such merchant data feeds). In this example, the merchant data feed includes a content classification (e.g., a merchant product data feed can include a product classification) that can then be used for performing various techniques disclosed herein for providing insights for web service providers. In some cases, the merchant data feed can be provided on a daily or hourly basis (e.g., or at some other periodic/time interval and/or based on demand). For example, the merchant data feed can be parsed using parsing rules configured for a given merchant or a set of merchants (e.g., based on types/groups of merchants) to extract attributes, such as title, heading, and description. In some cases, the merchant data feed can also include a content classification (e.g., a merchant product data feed can include a product classification) that can then be used for performing various techniques disclosed herein for providing insights for web service providers.

Another data source of information is behavioral user data on a web site, such as merchant web site 106. In some cases, a user may visit a merchant web page, such as a user using user browser 108 via network 104. For example, Java Script code (e.g., or other executable code/content) on the web page can make a pixel request to a server/service (e.g., to a server/service of the merchant data sources and/or a server/service of the service provider for the service for providing insights for web service providers) that includes, for example, a machine IP (e.g., the IP address associated with the user's device), a user ID (optional), a referrer URL, a web page URL, and/or other information (optional). The list of web page URLs can be combined periodically (e.g., each day or at some other periodic interval, implemented using an activity processor and co-visit pipelines/aggregator for collecting and aggregating web site activity, such as further described below with respect to FIG. 2) and provided as input to the above-described fetching and parsing process to extract information from web pages of a merchant's web site (e.g., each day or at some other periodic interval, implemented using a web crawler and web content aggregator for collecting and aggregating web site content, such as further described below with respect to FIG. 2). In an example implementation, for each user, information can be stored to identify products visited and purchased by the user. Similarly, information can be stored to aggregate all user visits and products purchased on the merchant web site. As such, various web site activity related metrics, such as number of impressions, number of views, number of purchases, and/or other metrics, can be collected to provide behavioral data on a merchant's web site, and the behavioral data on the merchant's web site can then be used for performing various techniques disclosed herein for providing insights for web service providers. For example, behavior data on a merchant's web site can be used to make recommendations (e.g., based on traffic and/or revenue in behavior data) to prioritize pages that are identified as having web site performance issues and which can also be identified with a higher priority for remediation action(s) (e.g., to fix the content related issues of one or more web pages, such as to recommend, for example, which web pages to modify based on users leaving the web site when users are navigated to or search results landing on such web pages, and/or various other recommendations for improving web site performance), such as further described below.

In one embodiment, the above-described processes for merchant data source collection and processing are performed per each merchant. For example, each merchant's data is processed independently using the above-described processes for processing each merchant's respective data sources to implement techniques disclosed herein for providing insights for each of the merchant's respective web sites.

In an example use case scenario, techniques disclosed herein for providing insights for web service providers, such as implemented by service for providing insights for web service providers 102, can be implemented for merchant web site 106. For example, an e-commerce web site for ACME Company that sells various clothing/apparel products can use the service to improve and/or monitor a performance of the web site (e.g., ACME can subscribe to the service, which can be provided as a cloud service). In an example implementation, the service for providing insights for web service providers generates a dashboard that can provide one or more recommendations based on a monitored performance of ACME's web site by applying the disclosed techniques. As an example, the dashboard can provide a report that includes one or more recommended actions to remediate one or more web service performance issues identified with ACME's web site using the disclosed techniques for providing insights for web service providers as further described below.

In an example implementation, insights for web services can be delivered by a third-party outsource/service provider as service for providing insights for web service providers 102, such as described herein.

An example of a system architecture of service for providing insights for web service providers 102 of FIG. 1 will now be described with respect to FIG. 2. Techniques for providing insights for web services are also described below with respect to FIG. 2.

System Architecture for Providing Insights for Web Service Providers

Figure 2:
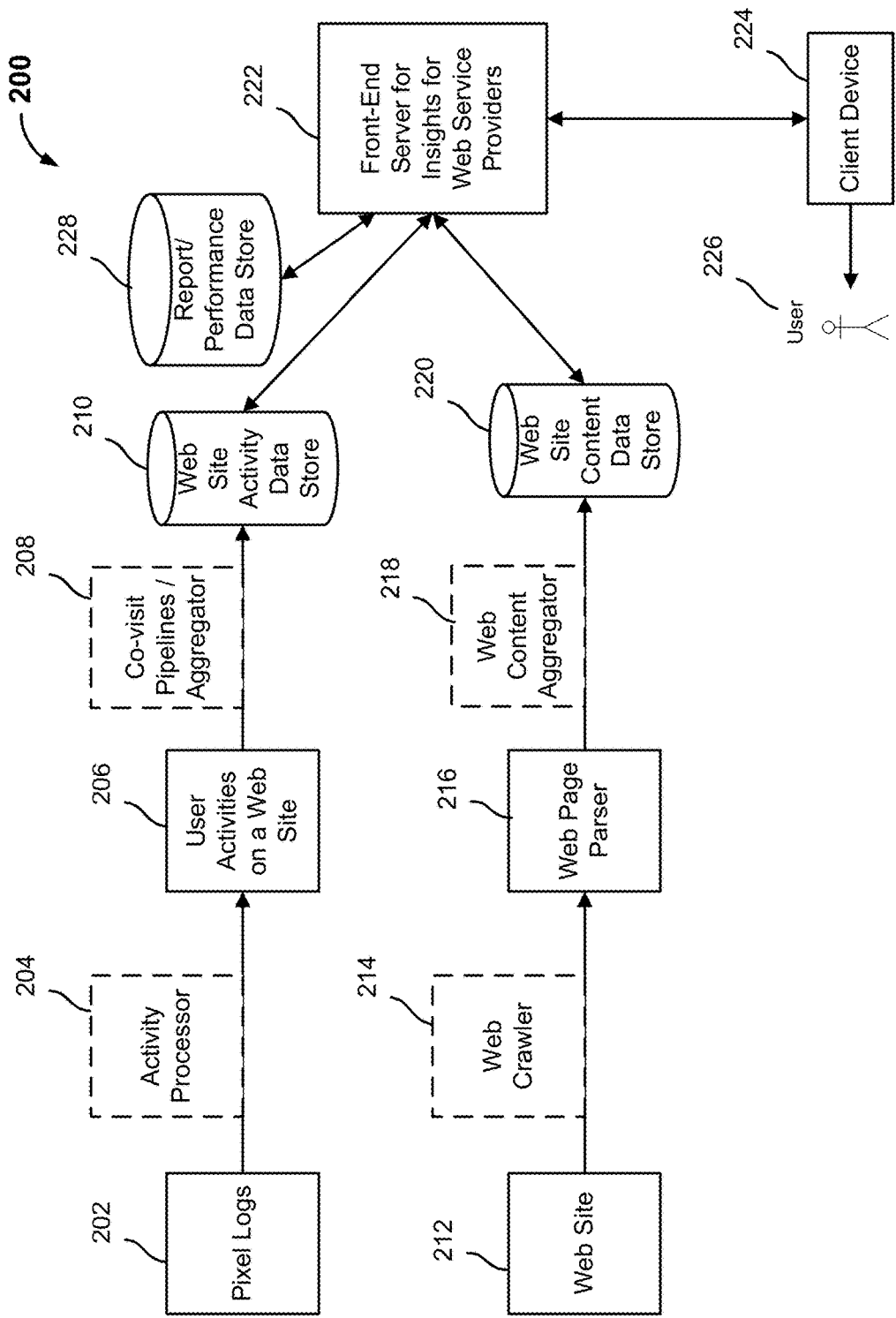
FIG. 2 is a functional block diagram illustrating an architecture of a system environment for providing insights for web service providers in accordance with some embodiments.

FIG. 2 is a functional block diagram illustrating an architecture of a system environment for providing insights for web service providers in accordance with some embodiments. In particular, various components of service for providing insights for web service providers 102 are shown in FIG. 2 in accordance with some embodiments.

As shown in FIG. 2, an architecture of service/system for providing insights for web service providers 200 can be implemented using several components to facilitate providing insights for web services (e.g., dashboards/reports, recommendations, and/or monitoring of remediation actions) for a given web site in accordance with some embodiments. As will be apparent to one of ordinary skill in the art, the various components (e.g., data stores, subsystems/engines, and other (sub)components) shown in FIG. 2 are an example implementation of an architecture for a service/system for providing insights for web service providers, and such components can be integrated and/or further separated into distinct sub-components to similarly implement the disclosed techniques for providing insights for web service providers.

In one embodiment, service/system for providing insights for web service providers 200 is configured to provide insights for web services (e.g., based on content of web pages associated with a web site and user activities monitored on the web site) using a variety of disclosed techniques for providing insights for web service providers, such as described below. For example, service for providing insights for web service providers 102 can generate a report and recommendations to enhance performance of a web site (e.g., playbooks/predefined reports and/or dashboards as further described below). As another example, service for providing insights for web service providers 102 can recommend one or more action(s) to enhance content of a web site to improve performance issues associated with content of the web site (e.g., to keep users from leaving the web site based on inadequate or irrelevant content on a given web page(s) of the web site) and to track actions performed based on those recommendations (e.g., annotated actions as further described below). These and other disclosed techniques that can be performed using system/service for providing insights for web service providers 200 are further described below.

As such, the disclosed techniques for providing insights for web service providers include new and improved solutions for measuring the performance of a web site (e.g., identifying and prioritizing various content related web site performance issues). For example, such new and improved techniques can be implemented using the disclosed system for providing insights for web service providers to associate behavioral data to an analysis of the web site content, such as visits and revenue, and provide metrics, reports, and recommendations associated with this correlated analysis over time. These and other techniques are further described below with respect to the system for providing insights for web service providers shown in FIG. 2.

In an example implementation, the system for providing insights for web service providers provides automated web site performance analysis and recommendations that identify various content related web site performance issues. For example, web site performance issues can relate to web pages that are problematic as users often leave the web site when landing on the web page, link structure issues that indicate a content navigation problem on the web site, search results that indicate a search result relevancy problem for site search on the web site, and/or other aspects of search and/or content/navigation related web site performance issues. The system for providing insights for web service providers can also track these issues over time (e.g., to show web site performance over a period of time for each of these issues, such as to indicate whether such issues are improving, and to track improvements resulting from implemented recommendations or remediation actions performed on the web site). The system for providing insights for web service providers can be implemented to perform these and other techniques as shown in FIG. 2 and described below.

Referring to FIG. 2, service/system for providing insights for web service providers 200 includes receiving pixel logs 202 (e.g., pixel log data as similarly described above) that can be processed using an activity processor 204 to collect user activities on a monitored web site (e.g., a web site subscribed to the service for providing insights for web service providers) as shown at 206 (e.g., activities on a web site, including, for example, a total number of visits, searches on a web site, revenue data, pages visited, Add To Cart (ATC) data, exiting the web site, etc.). For example, a merchant can have a web site, such as an e-commerce site or other type of site, and the merchant can be a customer (e.g., subscriber) to a service for providing insights for web service providers that is implemented using the system for providing insights for web service providers as further described below. A co-visit pipelines processor and aggregator 208 implements co-visit processing techniques, such as performing co-visit analysis techniques (e.g., a co-visit algorithm) as further described below, and aggregates the user activity data for storing in a web site activity data store 210 (e.g., a structured data store, such as an SQL database or other type of commercially available and/or open source data store).

In one embodiment, merchant data sources used by service/system for providing insights for web service providers 200 include behavioral data, which can include user activity data based on user interactions with the merchant web site. For example, the behavioral data can be captured and provided to the system for providing insights for web service providers using pixel log data techniques collected using pixel logs 202 as shown in FIG. 2, such as described above. In an example implementation, behavior data on a merchant's web site can be used to make recommendations (e.g., based on traffic and/or revenue in behavior data, based on user activity before and after a search on the web site, and/or based on other content and/or activity data and analysis) to prioritize pages that are identified as content related performance issues and which can also be identified with a higher priority for remediation action(s) (e.g., to fix the content related performance issues, and to recommend, for example, which page to modify based on traffic and/or revenue), such as further described below.

As also shown in FIG. 2, service/system for providing insights for web service providers 200 includes receiving web content from a monitored web site 212 that can be collected using a web crawler 214 to collect web pages on the monitored web site that can then be parsed using a web page parser 216 to extract web content of interest (e.g., category names, products, prices, links, etc.). For example, a merchant can have a web site, such as an e-commerce site or other type of site, and the merchant can be a customer (e.g., subscriber) to a service for providing insights for web service providers that is implemented using the system for providing insights for web service providers as further described below. A web content aggregator 218 aggregates the collected and parsed web content data for storing in a web site content data store 220 (e.g., an unstructured data store, such as an Apache Solr™ database or other type of commercially available and/or open source data store).

As also shown, service/system for providing insights for web service providers 200 includes a front-end server for insights for web service providers 222 that is in communication with web site activity data store 210 and web site content data store 220. A user 226 (e.g., an authorized user of the subscribing customer) accesses front-end server for insights for web service providers 222 via a client device 224 (e.g., a desktop, laptop, smart phone, tablet, or other type of computing device via the Internet using a web browser or other network communication protocol and interface).

In one embodiment, a web site 212 (e.g., an e-commerce/merchant web site or other type of web site) includes a corpus of content (e.g., a plurality of web pages). The web site can be crawled using web crawler 214 (e.g., a site fetcher), such as further described below.

In one embodiment, additional merchant data sources used by service/system for providing insights for web service providers 200 include a merchant data feed (e.g., which can be retrieved/received daily, hourly, or on some other periodic interval, schedule, and/or on demand and processed using another pipeline (not shown in FIG. 2) for storing in a structured data store), such as similarly described above with respect to FIG. 1. For example, the merchant data feed can include a product data feed that provides information included in the merchant's product catalog (e.g., in an XML format file or another format that can be parsed to extract attributes associated with products offered by a merchant, and can be provided as an incremental update to the merchant's product catalog). The merchant data feed can be collected by and/or sent to service/system for providing insights for web service providers 200 (e.g., and stored in the web site content data store or another data store, such as a structured data store for the product catalog data) as similarly described above with respect to FIG. 1.

In one embodiment, additional merchant data sources used by service/system for providing insights for web service providers 200 include a site map for web site 212. For example, the site map can provide a list of pages of the merchant web site (e.g., a list of URLs, which can be in an XML file format or other format) that are accessible to web crawlers or users, which can be used by web crawler 214 for crawling the merchant web site, such as further described below.

In one embodiment, additional merchant data sources used by service/system for providing insights for web service providers 200 include web server/API logs. For example, web server/API logs can provide server and API related logs for the server that hosts the merchant web site, which can be used by the system for providing insights for web service providers to perform various disclosed techniques for providing insights for web service providers, such as further described below.

As also shown, web pages on a web site (e.g., a merchant web site or other web site) are crawled and fetched using web crawler 214 (e.g., a web crawler/site fetcher that can crawl one or more URLs associated with the merchant web site and fetch content from each of the crawled web pages for storing and processing for techniques for providing insights for web service providers as further described below). For example, the web crawler can be configured to automatically perform this operation on a daily basis, weekly basis, or at some other periodic interval, schedule, and/or on demand. The crawled and fetched web pages (e.g., content available on the crawled web site) can be stored in a data store shown as web site content data store 220 (e.g., for storing the content from the crawled and fetched pages of the web site). As further described below, the stored content can be indexed to facilitate searching of the content. For example, the stored content shown at web site content data store 220 can be indexed using an Apache Solr™ open source enterprise platform or another commercially available or open source indexing platform.

Co-Visit Data Analysis Techniques for Determining Entity Relationships

In one embodiment, service/system for providing insights for web service providers 200 collects and analyzes co-visit data. Generally, co-visit data refers to a collection of behavioral data (e.g., user activities data on a monitored merchant web site) that uses relationships between entities to provide a better understanding of how various topics or entities are related to each other. For example, if it is known which other products are related to an original product, then the other products could be offered on the merchant web site as alternatives to that original product, such as if the original product was out of stock. These and other examples are further discussed below.

In one embodiment, the co-visit data can be determined across a variety of entities including, for example, the following: products, categories, brands of products, internal site search queries, and/or external site search queries. For example, the service/system for providing insights for web service providers can analyze behavior signals (e.g., user activities) including before and/or after behavior signals to identify problems and/or opportunities. As an example use case, assume that a user lands on a given (landing) web page of a merchant web site, and the user subsequently searches for women's shoes and views women's shoes products. In this example, the service/system for providing insights for web service providers can recommend a higher listing of women's shoes on the shoes page so that users do not have to perform a site search on the merchant web site for women's shoes. The source entity generally refers to the event that is associated with a problem and a target entity generally refers to the other events that can be shown, such as women's shoes products in this example.

In an example implementation, an entity event object (e.g., EntityEvent object specified by an event_type, entity_type, entity_ID, and global_frequency) can be associated with a source and/or target (e.g., pairwise frequency) based on an analysis of co-visit data. For example, the entity event object can include an event type, such as a page view, Add To Cart (ATC), conversion, and/or other types of events. The entity event object can also include an entity type, such as page, product, category, brand, or referrer query. The entity event object can also include an entity ID (e.g., an identifier for the entity) and a global frequency (e.g., GlobalFrequency is a raw global frequency associated with the entity event for the monitored web site). In this example implementation, the activity processor pipeline (204) outputs what each visitor did during a visit to the monitored web site, and the co-visit pipeline aggregator (208) outputs a raw global frequency and a pairwise frequency, which can be aggregated (e.g., aggregated across sessions/users). The co-visit association score can then be determined to provide a type of score to indicate how closely two entities are associated. For example, the co-visit score can be calculated from the raw frequency. Consider two entities, a source entity and a target entity, then the co-visit association score can be calculated as shown in the below example.

$$\text{Co-visit Association Score} = \frac{[\text{Pairwise Frequency of Source and Target}]}{(\text{Source\_GlobalFrequency} * \text{Target\_GlobalFrequency})}$$

In this example implementation, the activity and co-visit pipelines can also be configured to capture a plurality of dimensions on visit attributes (e.g., channel, device, geography, etc.) for the co-visit data.

A sample database schema for co-visit data is shown below.

create table ${merchant}_covisit_all (
    source_entity_value varchar(1600) not null distkey,
    source_entity_type int,
    source_event_type int,
    source_global_frequency int,
    target_event_type int,
    target_entity_type int,
    target_entity_value varchar(1600),
    target_global_frequency int,
    target_pairwise_frequency int
);

In one embodiment, a co-visit association score can be calculated from the above example table. For example, a co-visit association score can be calculated from the above example table for any combination of entities.

As an example, pairs of these entities can be used to uncover useful data that can be applied by the service/system for providing insights for web service providers. As an example use case scenario, co-visit association techniques as described herein can be used to identify products that are associated (e.g., most closely associated based on a (threshold) association score) with a query ranked by highest association score (e.g., query→product output indicates products that are most closely associated with the query ranked by highest association score), which can be applied to identify various opportunities for a merchant web site. Additional products associated with a given product can be identified for cross-promoting on the merchant web site or offsite, page creation on the merchant web site, in-store promotions, and/or navigation on the merchant web site. A product associated with a given category(ies) can be identified to improve ranking for site search results for the merchant web site. Additional category(ies) associated with a given category(ies) can be identified to improve a category tree for the merchant web site. A query(ies) associated with a given product(s) can be identified to improve site search (e.g., and better understanding of intent of the query) for the merchant web site. Product co-visit data associated with a given query(ies) can be identified to improve site search (e.g., to provide a better understanding of intent of the query/what visitors are seeking in site search results) for the merchant web site. Query co-visit data associated with a given query(ies) can be identified to improve site search (e.g., to provide a better understanding of what are related terms in a query) for the merchant web site. As will be apparent, these and/or other use case scenarios can be applied using the disclosed co-visit analysis techniques.

Reporting and Actions Based on Monitored Web Site Performance

In one embodiment, service/system for providing insights for web service providers 102 uses an insights for web services analyzer 200 to generate reports that can report information (e.g., a dashboard or playbook/pre-defined report for a web site analyzed by service for providing insights for web service providers 102) that reports on a performance of a web site and can also report on the performance of the web site over time. In an example implementation, the dashboard/report can include one or more recommendations for improving performance of the web site, such as further described below. Various types of reports can be sent from service for providing insights for web service providers 102 to a report/performance data store 228 (e.g., maintained by a back-end or front-end of the service/system for insights for web service providers, such as being stored in a web site performance data store as shown at 228). As further described below, the stored content stored in web site content data store 220 and the web site performance/report data stored in the report/web site performance data store can be indexed to facilitate searching of the content and report/performance data. For example, the stored report/performance data can be indexed using an Apache Solr™ open source enterprise platform or another commercially available or open source indexing platform.

In one embodiment, service/system for providing insights for web service providers 200 is configured to perform automatic remediation for one or more aspects identified based on recommended actions that are requested to be performed by a user (e.g., an authorized user of the subscribing customer for the merchant web site). For example, the system for providing insights for web service providers can automatically add content (e.g., by leveraging the existing content on a merchant's web site) to one or more web pages of a web site to remediate for thin content on the web site, such as using a related products widget and/or related searches widget to supplement a thin content issue identified in a report for one or more web pages of the web site. In an example implementation, such widgets can be dynamically populated via a remote API (Application Program Interface) call or other data delivery mechanism.

In an example implementation, service/system for providing insights for web service providers 200 is implemented using a cloud computing service, such as using Amazon Web Services™ (AWS), and the various data stores (e.g., web site activity data store 210, web site content data store 220, and/or report/performance data store 228) can be implemented using a cloud data warehouse solution, such as using Amazon Redshift™, which provides a fast, fully managed petabyte-scale data warehouse solution. In an example implementation, the above-described pipelines (e.g., and/or additional pipelines, such as for processing a merchant product data feed) are implemented as jobs that can be executed periodically (e.g., once per day, at night, and/or at some other interval) executed on server class hardware (e.g., AWS Redshift). For example, the data fetched/received from various merchant data sources (e.g., merchant data sources 110 as shown in FIG. 1) can be processed by service/system for providing insights for web service providers 200 by performing a MapReduce job (e.g., implemented using the Apache® Hadoop™ framework for performing a distributed processing of large data sets across clusters of computers, for example, using server class hardware, such as provided by the AWS cloud computing environment). In an example implementation, the above-described front-end server can also be performed on server class hardware (e.g., AWS Redshift), which can execute queries against the data store to generate results and/or reports to present to a user accessing the front-end server via a client device executing a web browser as further described below.

Front-End Server for Insights for Web Service Providers

As also shown in FIG. 2, an insights front-end service 222 is in communication with report/performance data store 228. For example, the insights front-end service can be implemented as a web user interface that facilitates user interactions, such as a user 226 (e.g., an admin of a merchant web site who is an authorized user to access the dashboard/reports and to manage web site performance issues for the merchant web site), to access the dashboard/reports (e.g., over the Internet, such as using a secure protocol, such as HTTPS or another secure protocol). Example web site performance dashboards/reports are further described below. In some cases, the user can use the insights front-end service to configure and/or perform recommended (remedial) actions for a web site (e.g., the merchant site that has been analyzed by service/system 200 using the disclosed techniques for providing insights for web service providers), such as further described below.

In an example implementation, recommended (remedial) actions, such as described above and/or with respect to other recommended remedial actions described herein, can be automatically implemented (e.g., with web site owner/admin approval or configuration for default remedial actions to be automatically implemented) by programmatically adding content and/or links to one or more web pages of a web site based on recommendations using, for example, widgets (e.g., service provider widgets, such as a related products widget, a related searches widget, and/or other widgets, which can communicate with the system for providing insights for web service providers via an API) to dynamically add content/links and/or to perform other content related actions to content of the site. For example, a dashboard user interface (UI) (e.g., a web graphical user interface (GUI)), accessible by a user 226 via insights front-end service 222, can be provided to allow an administrator (admin) of the web site to approve or not approve recommended remediation actions, which can then be automatically remediated using such techniques, and/or to provide the admin with a tool that facilitates a selection of content to include and/or a manual override of suggested content that can be used for the automatically generated content for implementing the recommended actions, such as adding automatically generated content for a page using one or more widgets.

In one embodiment, the above-described processes for merchant data sources' collection and processing are performed per each merchant. For example, each merchant's data is processed independently using the above-described processes for processing each merchant's respective data sources to implement various techniques disclosed herein for each of the merchant's respective web sites.

An example component diagram showing various components of service/system for providing insights for web service providers 102 of FIG. 1 will now be described with respect to FIG. 3. Techniques for providing insights for web services are also described below with respect to FIG. 3.

Figure 3:
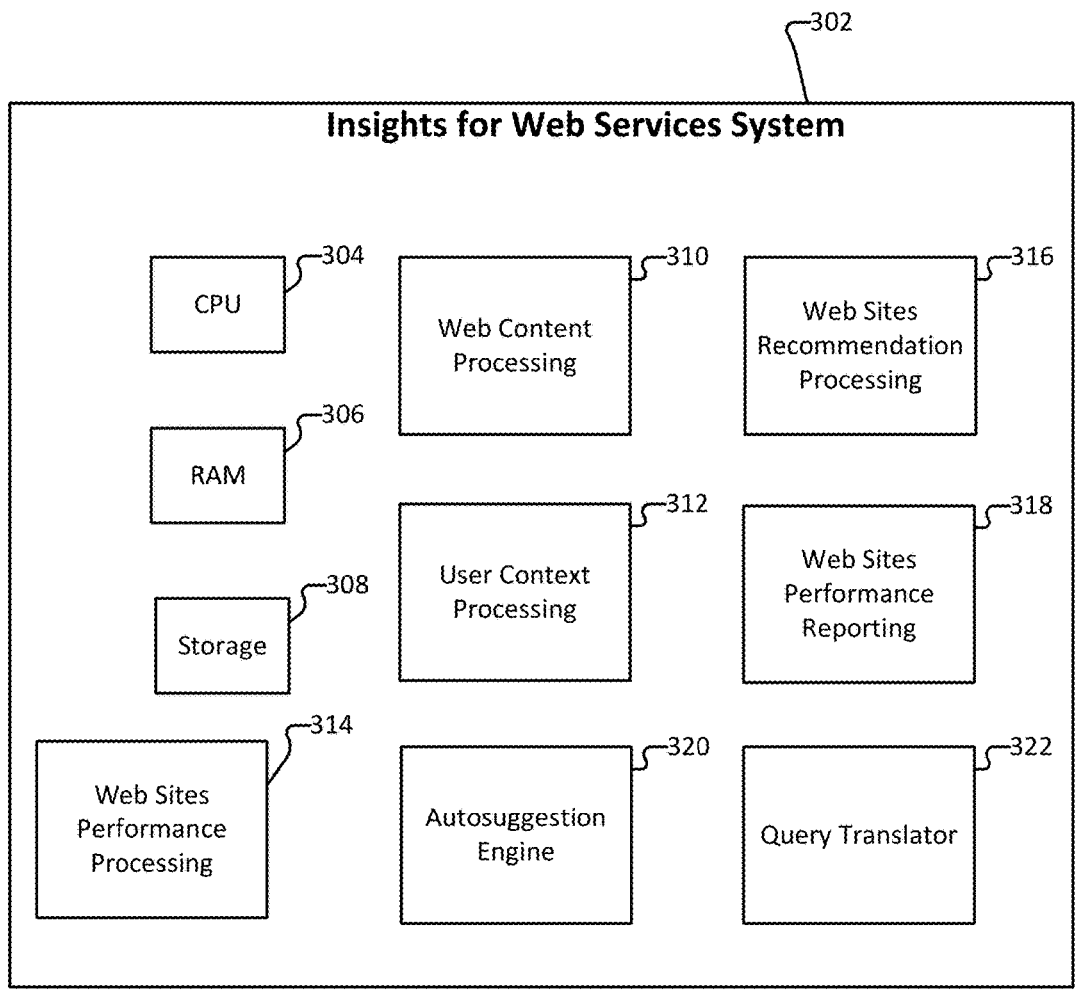
FIG. 3 is a component diagram illustrating components of a system for providing insights for web services in accordance with some embodiments.

FIG. 3 is a component diagram illustrating components of a system for providing insights for web services in accordance with some embodiments. As shown, an insights for web services system 302 includes a CPU 304, a RAM 306, and a data storage 308. For example, insights for web services system 302 can be implemented to provide service/system for providing insights for web services 102 as shown in FIG. 1 and as also shown in FIG. 2.

As also shown in FIG. 3, insights for web services system 302 includes a web content processing component 310 (e.g., to process web content of a web site to implement various techniques described herein). In one embodiment, insights for web services system 302 also includes a user context processing component 312 (e.g., behavior signal data that provides monitored/tracked user activities data can be provided for subscriber/monitored web sites by using click logs/pixel tags data for monitoring user activities during a session to provide a user's browsing history, and/or other behavior signal data as described herein). In one embodiment, insights for web services system 302 also includes web sites performance processing component 314 (e.g., for processing performance signals associated with one or more web pages for subscriber/monitored web sites and/or for analyzing content of one or more web pages for subscriber/monitored web sites, which can be used to generate performance reports for the web site, as further described herein). In one embodiment, insights for web services system 302 also includes a web sites recommendation processing component 316 (e.g., for generating various recommendations to improve performance of subscriber/monitored web sites using various techniques described herein). In one embodiment, insights for web services system 302 also includes a web sites performance reporting component 318 (e.g., for generating dashboards and/or reports on a performance of subscriber/monitored web sites using various techniques described herein). In one embodiment, insights for web services system 302 also includes an autosuggestion engine 320 (e.g., to autofill suggested queries for a natural language query to query web site performance related data stored in unstructured and structured data stores using various techniques disclosed herein). In one embodiment, insights for web services system 302 also includes a query translator 322 (e.g., for translating a natural language query to a structured query to query web site performance related data stored in unstructured and structured data stores using various techniques disclosed herein). The processing performed by each of these components is further described below.

In some implementations, one or more of these functions/components can be performed by another device or function/component, such that the user context/behavior signal processing and/or the other signal processing can be performed using another device or function/component, which can provide respective input to the insights for web services system. As another example implementation, various components can be implemented as a common component, such as a user context/behavior processing component that can be implemented to receive and process both behavior signals and other signals (e.g., web page performance signals). In an example implementation, the insights for web services system is implemented using the Apache Solr™ open source framework, the Apache Cassandra™ database, and various other components as further described below.

In an example implementation, insights for web services system 302 can be implemented to provide the insights for web services system/service 102 described above with respect to FIG. 1 and FIG. 2. For example, web pages for a subscribing merchant web site (e.g., a web site that subscribes to the insights for web services service 102) and performance data associated with the subscribing merchant web site can be processed using CPU 304 and RAM 306 to automatically generate a report including a recommendation to improve performance of the subscribing merchant web site and accessed through a web-based dashboard by a subscribing user for the merchant web site via the user's web browser executed on the user's device (e.g., a client/computing device, such as via a web browser executed on a smart phone, laptop, computer, or other client/computing device).

User Interface Generated by the Insights for Web Service Providers System

Figure 4:
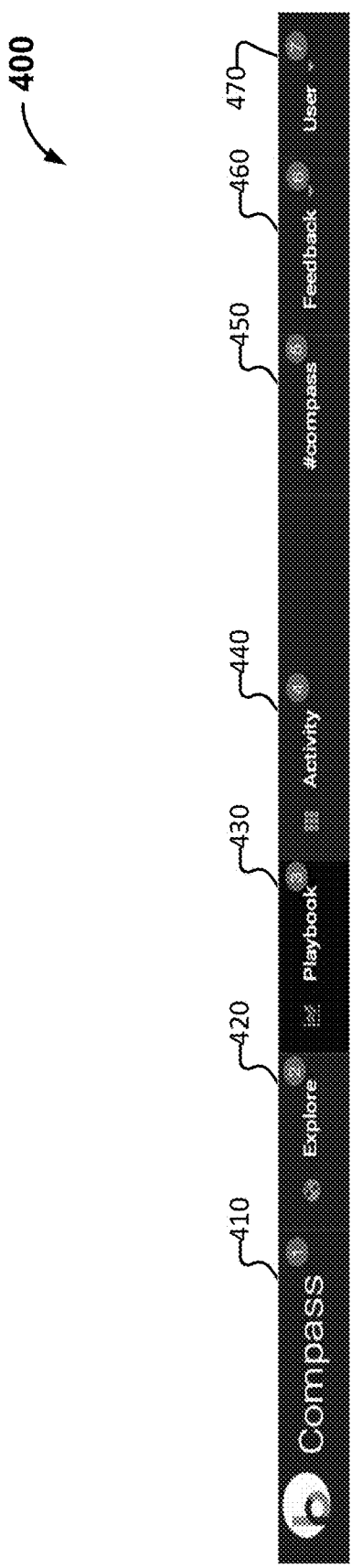
FIG. 4 is a screen diagram illustrating a navigation bar of a user interface generated by the insights for web service providers system in accordance with some embodiments.

FIG. 4 is a screen diagram illustrating a navigation bar of a user interface generated by the insights for web service providers system in accordance with some embodiments. For example, the insights for web services system can be implemented as similarly described above with respect to the service/system for providing insights for web service providers as shown in FIGS. 1-3.

In one embodiment, the insights for web services system is provided as a solution (e.g., a product solution/service, such as the Compass product solution/service provided by BloomReach Inc.) that can guide a web site IT/marketing team to the highest impact content opportunities to quickly influence the top line of online activities through the web site. In an example implementation, the insights for web services system implements one or more machine learning algorithms (e.g., association rule mining, frequent itemset mining, and/or sequential pattern mining) to efficiently disregard noise in web site performance data and to facilitate a prioritization of online opportunities through the web site, guide users to solutions, and track results of modifications made to the web site. For example, association rule mining can be used to identify search queries that are related to every page. These queries can be used as a proxy for intent for the related page.

In one embodiment, the insights for web services system includes a user interface implemented as a Graphical User Interface (GUI) of the Compass product solution/service (e.g., Compass is a commercially available product solution/service available from BloomReach Inc.) as shown in FIG. 4. For example, a user can navigate through the user interface/GUI using the top-level dropdown menus at navigation bar/guide 400, such as shown in FIG. 4 and described below.

Referring to FIG. 4, top navigation guide 400 includes a Compass home button as shown at 410. For example, Compass is the home button and can navigate users to a main open query page. The main open query page can connect users to a flexible, natural-search engine where users can use free text to search (e.g., and if users do not know how or what to search, suggestions can be automatically generated and displayed), such as further described below.

As also shown, top navigation guide 400 includes an Explore menu as shown at 420. For example, the Explore menu connects users to the flexible, natural-search engine in the Compass product solution/service as well as to the specific dashboards where users can pinpoint multiple opportunities. In an example implementation, the Explore menu can connect users to a "Getting Started" search box for performing natural language searches and various dashboards including a category dashboard, a site search dashboard, and a product dashboard, which are each further described below.

As also shown, top navigation guide 400 includes a Playbook menu as shown at 430. For example, the Playbook menu provides more structure to user discovery. In an example implementation, the Playbook menu provides users access to predefined reports for discovering insights in site search, categories, and promotions for the web site. These reports focus on the end goals of user day-to-day activities by exposing multiple prioritized lists of opportunities as well as potential queries to help users explore web site performance data in more detail. The reports can identify opportunities based on a rolling 30-day average from the date of viewing the report or based on some other time period.

As an example report, an improve site search results report can identify opportunities to improve internal site searches on the web site, such as identifying new synonyms and content for site search results. As another example report, an improve category navigation report can identify opportunities to improve product assortments on the web site, such as identifying which content to have on a page as well as which links to add to category pages to promote revenue. As yet another example report, a find promotion opportunities report can identify opportunities to improve promotions on the web site, such as identifying which products to promote in banners, through boosting and burying, or through other online marketing campaigns.

As also shown, top navigation guide 400 includes an Activity menu as shown at 440. For example, the Activity menu shows all of the actions a user has performed as a result of using the Compass product solution/service. In an example implementation, the actions can be filtered by activity type, user, date range, and/or other parameters. The actions can be further analyzed to view a business impact of any action(s) performed using the Compass product solution/service and/or to compare the performance of any such action(s) to a baseline and/or other performance metric.

As also shown, top navigation guide 400 includes a #compass menu as shown at 450. For example, the #compass menu is a live stream of the activity of other users in the user's organization using the Compass product solution/service (e.g., activities can be anonymized).

As also shown, top navigation guide 400 includes a Feedback menu as shown at 460. For example, the Feedback menu connects a user to the support team/service for the Compass product solution/service.

As also shown, top navigation guide 400 includes a User menu as shown at 470. For example, the User menu allows users to log into or out of the Compass product solution/service.

Identifying and Prioritizing Opportunities for a Web Site

In one embodiment, predefined reports (e.g., also referred to herein as Playbooks) are provided for discovering insights in site search, categories, and promotions for a web site. As similarly described above, the predefined reports can focus on the end goals of user day-to-day activities by exposing multiple prioritized lists of opportunities as well as potential queries to help users explore web site performance data in more detail.

In one embodiment, a predefined report facilitates identifying and prioritizing opportunities for a web site. For example, a user can start in a selected Playbook to identify the top opportunities based upon specified business goals. As further described below, in an example use case scenario within the Playbook menu/screen of Compass, a user can navigate to a desired report (e.g., a predefined report/Playbook), sort results based on business impact focus, and click on a pop-out link to view the current experience live on the monitored web site.

Overview of Playbooks/Predefined Reports for a Web Site

In one embodiment, one or more Playbooks/predefined reports are disclosed for providing insights for web service providers (e.g., to identify and prioritize opportunities for a web site provided by a web service provider). For example, a Playbook can include a report of web site signals to determine whether the web site is performing well or where improvement opportunities are available. The web site signals can be captured based on site searches (e.g., searches performed by a user(s) on the web site), categories on the web site (e.g., category web pages on the web site), and/or other types of web pages on the web site, as further described below. Recommendations for changes to the web site can be generated based on the web site signals, as also further described below.

As an example, the web site signals related to categories on the web site can be automatically analyzed to determine that a new category page is recommended and/or that content should be added to/removed from a given category page. As another example, the web site signals related to site searches on the web site can be automatically analyzed to determine that search results for a given query should be modified such as to move one or more products higher/lower on the site search results page in response to the given query. These and other examples are further described below.

Example Playbooks/Predefined Reports to Improve Site Search

An improve site search results playbook can include various example reports and helpful queries to get users started with identifying and prioritizing opportunities related to site search on a web site. For example, an improve site search via a product page views report provides a predefined report for site search queries sorted by lowest product views per report. This report can help users discover queries where visitors did not find enough or relevant products in the result of their site search on a web site. The report can include a metric "product views per search," which corresponds to the average number of product results viewed from the search before the visitor performs another search. In this example, site search queries with low product views per search can indicate thin or non-relevant results. In an example implementation, a user can click on a desired query and choose from the menu of "More Insights." In some cases, such a site search report can assist in determining which products the visitor is looking for or what queries they use as refinements to their site search queries.

As another example, an improve site search via Add To Cart (ATC) rate report provides a predefined report for internal site search queries sorted by lowest ATC rate. This report can help users discover queries that are associated with a low conversion rate. In this example, the ATC rate for a query is the average number of products added to the cart from the search results of the query. In an example implementation, a user can click on a desired query and choose from the menu of "More Insights." In some cases, such a site search report can assist in determining products that are highly associated to the query and have higher ATC rates.

As yet another example, an improve site search via exit rate report provides a predefined report for internal site search queries sorted by highest exit rate (e.g., a negative web site performance signal in response site search results). This report can help users discover queries that resulted in the visitor subsequently exiting the site. In this example, the exit rate of a query is calculated as the percentage of visitors that exited the site on the search results page of that query. In some cases, a high exit rate may be an indicator of thin content, non-relevant site search results, inadequate filtering, and/or poor navigation on the site. In an example implementation, a user can click on a desired query and choose from the menu of "More Insights." In some cases, such a site search report can assist in identifying or narrowing down the issue with several more views of data for the query.

Example Playbooks/Predefined Reports to Improve Category Navigation

An improve category navigation playbook can include various example reports and helpful queries to get users started with identifying and prioritizing opportunities to improve category page navigation on a web site. For example, a best and worst performing categories report provides a predefined report for the best and worst performing categories on a web site. This report can help users identify pages that are performing well or poorly based on the conversion behavior from the next page the visitor clicked on. In some cases, this report can facilitate identifying good category pages to promote or market that have a high probability of creating conversions. Inversely, this report can facilitate identifying category pages that are not resulting in product conversions and choose to either optimize or demote those categories/category pages. In an example implementation, a conversion attribution rate can be determined based on a conversion anywhere (e.g., similar to any click, conversion anywhere represents conversions realized on any page in a session of a visitor on the site, regardless of the click path before or after to the reported category), a conversion after (e.g., a more narrow view than conversion anywhere, as conversion after represents conversions realized after the buyer clicked on the reported category), or a conversion next (e.g., an even more narrow than conversion after, as conversion next represents conversions/revenue realized on the page directly after the reported category, that is, the buyer from the reported category pages clicked on a product page and converted). As an example, a user can select column filters and sort pages with high conversion rates or Revenue Per View (RPV). For instance, a user can use this report to identify low performing categories by sorting revenue ascending and placing a desired minimum for product page views (e.g., a user can choose to optimize those pages, in which case the category page dashboard and/or best next page report can be useful, as described herein).

As another example, an improve underperforming category pages report provides a predefined report for the category pages with the highest exit rates. This report can help users identify categories that resulted in a visitor subsequently exiting the site. In this example, the exit rate of a query is the percentage of visitors that exited the site upon landing or navigating to that category page. In some cases, a high exit rate can be caused by thin content, non-relevant results, poor assortments, inadequate filters, and/or poor navigation. As an example, a user can customize the underperforming category report thresholds (e.g., visits, co-viewed products (such as based on a co-visit association score), and/or device). In an example implementation, a user can click on a desired category ID and choose from the menu of "More Insights" (e.g., the "Category Page Dashboard" will help a user expand the data for that category to gain more valuable insights). An example insight is to add co-viewed products to lower a low performing category page (e.g., a boys costume category page on an example web site, which can be performed by going to the improve underperforming category pages report and searching the report by "costume," viewing a high exit rate for the boys costume category page, clicking on a category ID and selecting the category dashboard, and finding top co-viewed costumes that are not displayed on the boys costume category page).

As another example, an improve thin category pages report provides a predefined report for the category pages with the highest exit rates. This report can help users identify category pages with thin and/or irrelevant content. For instance, this report can help users discover categories in which visitors looked elsewhere on the site to find the products they were looking for. In this example, co-viewed products with a category page can be a signal of the true intent of visitors. Cases in which the co-viewed products and the products on the category page are very different can be a signal of a potential opportunity for optimization. This report can also help users discover pages which have a low product count and may be missing content. As an example, a user can customize the improve thin category pages report thresholds (e.g., visits, device, and/or co-visit association score). In an example implementation, a user can click on a desired category ID and choose from the menu of "More Insights" (e.g., the "Category Page Dashboard" will help a user expand the data for that category to gain more valuable insights). An example insight is to add more products to a thin category page (e.g., add belts $12 and under on a men's clearance belts page on an example web site, which can be performed by going to the thin category pages report and filter by men's, find men's clearance belts page among top pages with a high percentage co-viewed not on the category page, check products co-viewed for clearance belts page, and visitor appears to be looking for belts in the $8-12 range which do not appear on the clearance category page).

As another example, a link promotion or demotion opportunities report provides a predefined report for identifying promotion or demotion opportunities for categories/category pages. This report can help users identify categories/category pages in which the visitor often navigated to through other links on the page and converted more often on some than others. In this example report, category pages with highly diverse next page Revenue Per Clicks (RPC) can often be revealed/presented. In this example, next key pages can represent the number of pages the visitor clicked through from the category pages (e.g., a preset threshold can be configured to be a minimum 3% click through rate from the reported category), and the next page performance diversity can represent the disparity of revenue among the "Next Key Pages" (e.g., if one link comprises 90% of revenue in the set, the "next page performance diversity" will be very high). This is indicative of a problem as two links have similar click throughs but very diverse set of revenue per clicks. The user interface (UI) placement of these links should potentially change so as to encourage the click through the higher revenue per click (RPC) link. As an example for applying this report, a user can use the best next page report to complete an opportunity discovery (e.g., copying a desired URL from this report and pasting into the report under Optimize Key Pages). As another example for applying this report, a user can extract the category ID and run on the category page dashboard to explore the data for that category to gain more valuable insights.

As another example, an optimize key pages report (e.g., also referred to as the best next page report) provides a predefined report for identifying a best next page. This report can help users identify where the visitor navigated to from the original page and what resulted in the most conversions. As such, this report can help identify opportunities to re-organize links and navigation on the page. In an example implementation, the optimize key pages report is focused on canonical URLs which are indexed by organic search, and a more complete breakdown of next page URLs is described below with respect to the best next page (uncanonicalized).

As another example, an optimize key pages (uncanonicalized URLs) report (e.g., also referred to as the best next page report (uncanonicalized)) provides a predefined report that shows where a visitor navigated to from an original page and what resulted in the most conversions. For example, this report can help users identify opportunities to re-organize links and navigation on the page. In addition, this report can help users better understand the visitor's behavior and intent based on where they most likely navigated to convert. In an example implementation, this report can include any parameter variations in the URL, which will help users determine which link the visitor clicked on (e.g., left nav, top nav, and/or page image). As another example for applying this report, a user can extract the category ID and run it on the category page dashboard to explore the data for that category to gain more valuable insights. An example insight is to promote/add an image for a product on a category page (e.g., promote/add an image for men's socks on a men's clothing category page to boost top selling/co-viewed products on a socks category page, which can be performed by going to the optimize key pages (uncanonicalized URLs) report, inserting the URL for the men's clothing category page and run the report, determining that men's socks is a top navigated to page in which the link is in the left nav, but it is higher than any of the page category images, and checking the category page dashboard for men's socks (e.g., ID: 4294723349+4294719514+4294719810 in this example), and determining that most often visitors are looking for Nike socks, but it is fragmented on the page).

Example Playbooks/Predefined Reports to Find Promotion Opportunities

A find promotion opportunities playbook can include various example reports and helpful queries to get users started with identifying and prioritizing opportunities for marketing key products, brands, and/or categories on a web site. For example, a find promotion opportunities report provides a predefined report for trending queries performed using a site search on a web site. This report can help users identify queries that are growing in volume on the site and indicate that demand for those items on the site is increasing. For example, this report can include a recommendation to feature categories or merchandise co-viewed with those queries to match the growing query trend as a signal (e.g., a user behavior signal associated with user activities on the site) for user demand on the site for such categories or merchandise co-viewed with those queries.

As another example, a product promotion opportunities report provides a predefined report for identifying categories/search terms to (best) promote a particular product offered for sale on the site. In some cases, this report can help users identify where best to promote a product using the last click revenue attribution to determine which categories and search terms drove the most sales and visits to a particular product offered for sale on the site.

Overview of a Playbooks/Predefined Reports Interface

Figure 5:
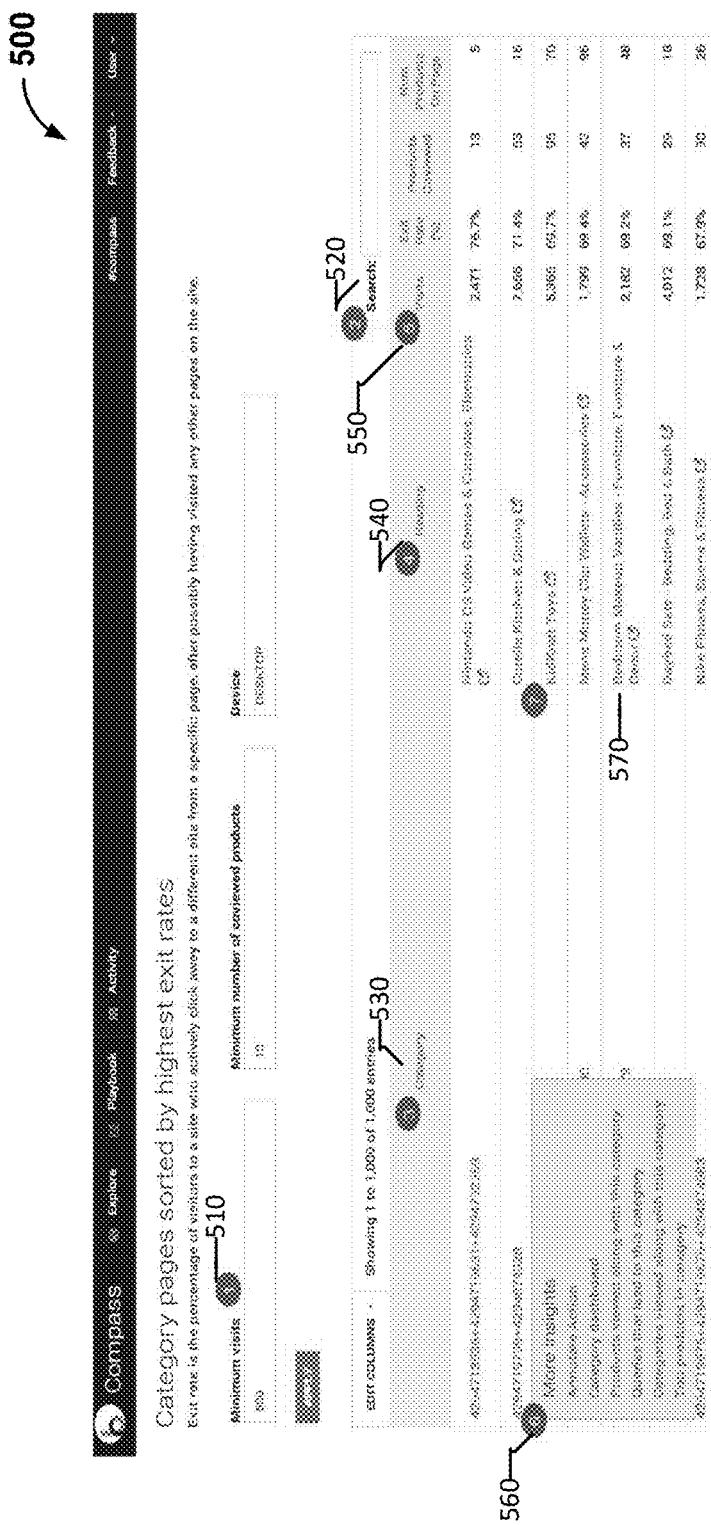
FIG. 5 is a screen diagram illustrating a user interface of an example report generated by the insights for web service providers system in accordance with some embodiments.

FIG. 5 is a screen diagram illustrating a user interface of an example report generated by the insights for web service providers system in accordance with some embodiments. For example, the insights for web services system can be implemented as similarly described above with respect to the service/system for providing insights for web service providers as shown in FIGS. 1-3.

Referring to screen 500 of FIG. 5, an example report (e.g., playbook/predefined report) for category pages sorted by highest exit rate as similarly described above is presented. At 510, criteria for the report are provided, including in this example, a minimum number of visits field (e.g., 500 or some other minimum number of visits), a minimum number of co-viewed products field (e.g., 10 or some other minimum number of co-viewed products), and a device field (e.g., desktop or other types of devices), in which each of the fields can be adjusted to set desired criteria for the report.

At 520, a search box is provided. For example, the search box can be used for a search within the URL, query, and heading of web content/pages for the monitored web site.

At 530, a category hyperlink is presented as the opportunity detailed by this example report as this example report deals with categories. For other reports, the entity (e.g., brand, product, category, or query) can be presented here.

At 540, a heading hyperlink is presented as the title of the live page indicated in this example report and refers to the entity.

At 550, various metrics are displayed in this portion of this example report (e.g., visits, exit rate (%), products co-viewed, and number of products on a page). In an example implementation, a user can adjust these in "Edit Columns." Reports can be pre-sorted by the type of report. In this example, the category pages sorted by highest exit rates report is pre-sorted by exit rate as shown.

At 560, the more insights menu is shown. In an example implementation, the more insights menu provides a more insights feature that is triggered by clicking on a hyperlink for an opportunity, such as a category opportunity in this example report. The more insights can provide users with various guided solutions to refine user actions based on opportunities identified by the report.

At 570, data details are presented. For example, the data details can include various relevant data details from the actual live page on the monitored web site for each opportunity. In an example implementation, selecting the icon can open the relevant live page of the site.

For example, once an opportunity based on the report is identified, a user can select the more insights feature to guide the user to a solution as shown at 560. To access the more insights feature, an opportunity presented in the report can be selected, and the more insights feature/menu will open. Each more insights menu can present solution-oriented recommendations relevant to the selected opportunity.

In one embodiment, the insights for web services system (e.g., Compass) provides users with many options for idea generation. For example, playbooks are provided for idea generation (e.g., identifying and prioritizing opportunities) as similarly described above and further described below. As another example, #compass is provided for idea generation (e.g., identifying and prioritizing opportunities) as similarly described above and further described below. As yet another example, dashboards are provided for idea generation (e.g., identifying and prioritizing opportunities) as similarly described above and further described below.

In one embodiment, the insights for web services system (e.g., Compass) provides users with playbooks/predefined reports for idea generation. For example, a playbook can provide a user with a structured way to identify the top areas of opportunity for online merchandisers for a merchant web site. In an example implementation, to get to a playbook, select from the top-level navigation for Playbook as shown in FIG. 4.

In one embodiment, the insights for web services system (e.g., Compass) provides users with #compass for idea generation. For example, #compass can provide a user with an ongoing, real-time feed of the activities taken by the users in the subscribing entity's organization (e.g., merchant) to inspire users to new actions that can be performed to enhance performance of a merchant web site. In an example implementation, to get to #compass, select from the top-level navigation for #compass as shown in FIG. 4 (e.g., and scroll through and read past actions taken, in which a user can click on the action to replicate the exploration previously performed by another user).

In one embodiment, the insights for web services system (e.g., Compass) provides users with dashboards for idea generation. For example, a dashboard can provide a user with an at a glance view of all of the different types of opportunities available if exploring products, brands, categories, or site search opportunities for a merchant web site. In an example implementation, to get to dashboards, select from the top-level navigation for Explore as shown in FIG. 4 (e.g., and select a desired dashboard, such as for products, brands, categories, or site search opportunities).

Overview of a Dashboards Interface

In one embodiment, a dashboard interface is provided. In an example implementation, the Dashboards link from the playbooks where opportunities are given (e.g., site search opportunities, promotions opportunities, etc.). Once a user identifies a problem site search term, for example, the user can go to the site search dashboard to help identify the solution. The dashboards provide a quick scan view of various possible solutions to the issue. The solutions may incorporate the association score data (e.g., as described previously) to uncover what the products the user may have been looking for when they searched for that term.

Figure 6:
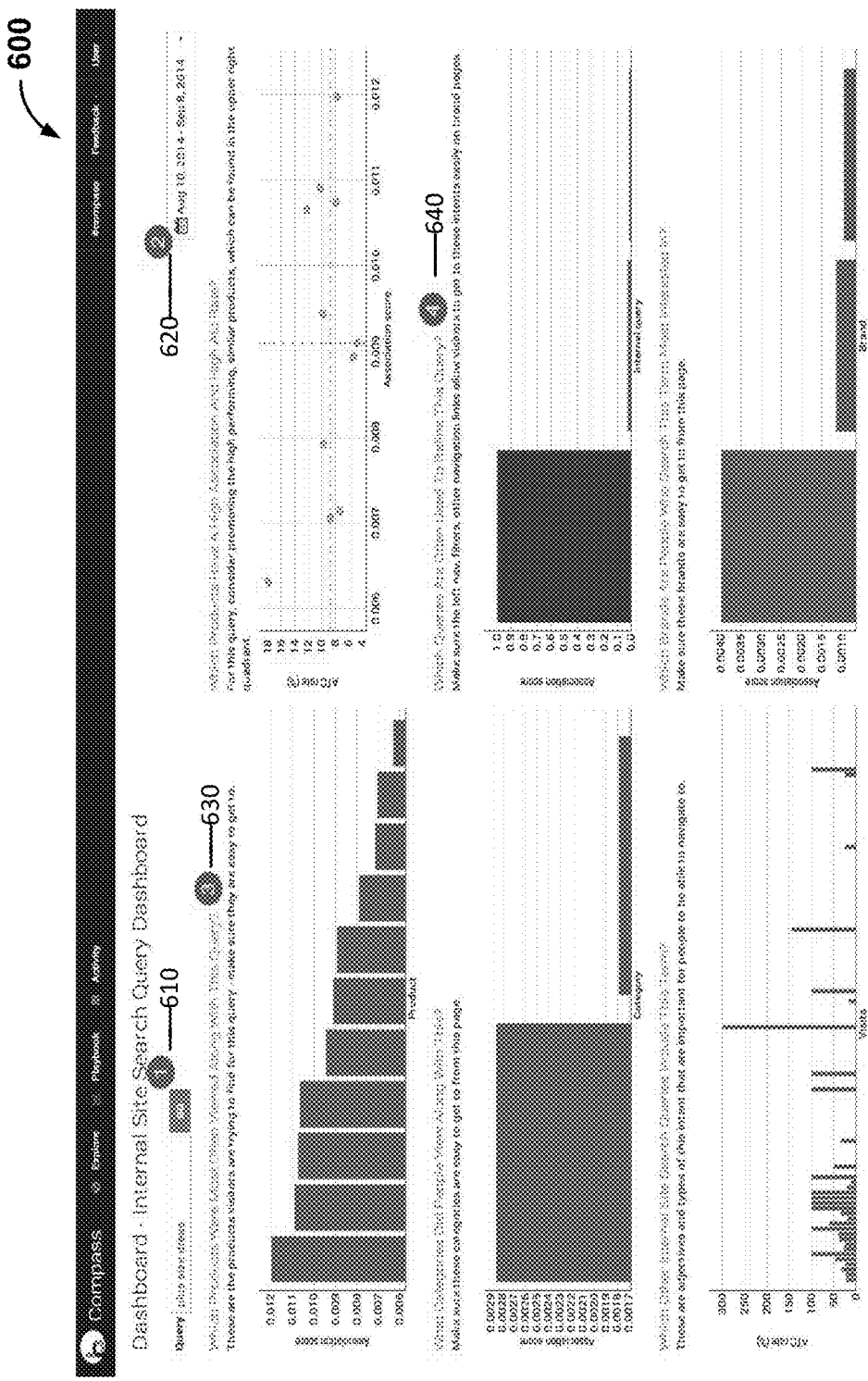
FIG. 6 is a screen diagram illustrating a user interface of an example dashboard generated by the insights for web service providers system in accordance with some embodiments.

FIG. 6 is a screen diagram illustrating a user interface of an example dashboard generated by the insights for web service providers system in accordance with some embodiments. For example, the insights for web services system can be implemented as similarly described above with respect to the service/system for providing insights for web service providers as shown in FIGS. 1-3.

Referring to screen 600 of FIG. 6, an example dashboard for internal site search query is presented. At 610, a custom query field is shown. For example, a user can type in any search term, category, brand or product for their respective report in the custom query field.

At 620, a date field is shown. For example, a user can use the date selector to select set date ranges or customize their own date range of interest for the dashboard.

At 630, various tailored reports are presented. For example, relevant report summaries for the entered custom query and date range selected are displayed.

At 640, detailed reports are presented. For example, if a user clicks on a report title, then the full detail of the queried data can be displayed.

In one embodiment, the insights for web services system (e.g., Compass) provides users with a search interface for idea generation. For example, the search interface can be implemented to provide a flexible user interface that lets users perform searches using natural language queries to explore ideas for identifying/prioritizing opportunities/insights for the monitored web site. In an example implementation, to get to the search interface, a user can select from the top-level navigation for Explore>Getting Started (e.g., and use the date selector (620) to choose a date range or create a custom date range). In one embodiment, as the user types in a query in the search box (610), the insights for web services system (e.g., Compass) autofills to specific queries to help users build their search request (e.g., from the results, users can adjust the graphical interface and table using the dropdown menus, such as further described below).

Tracking Activity and Measuring Impact of Actions

Figure 7:
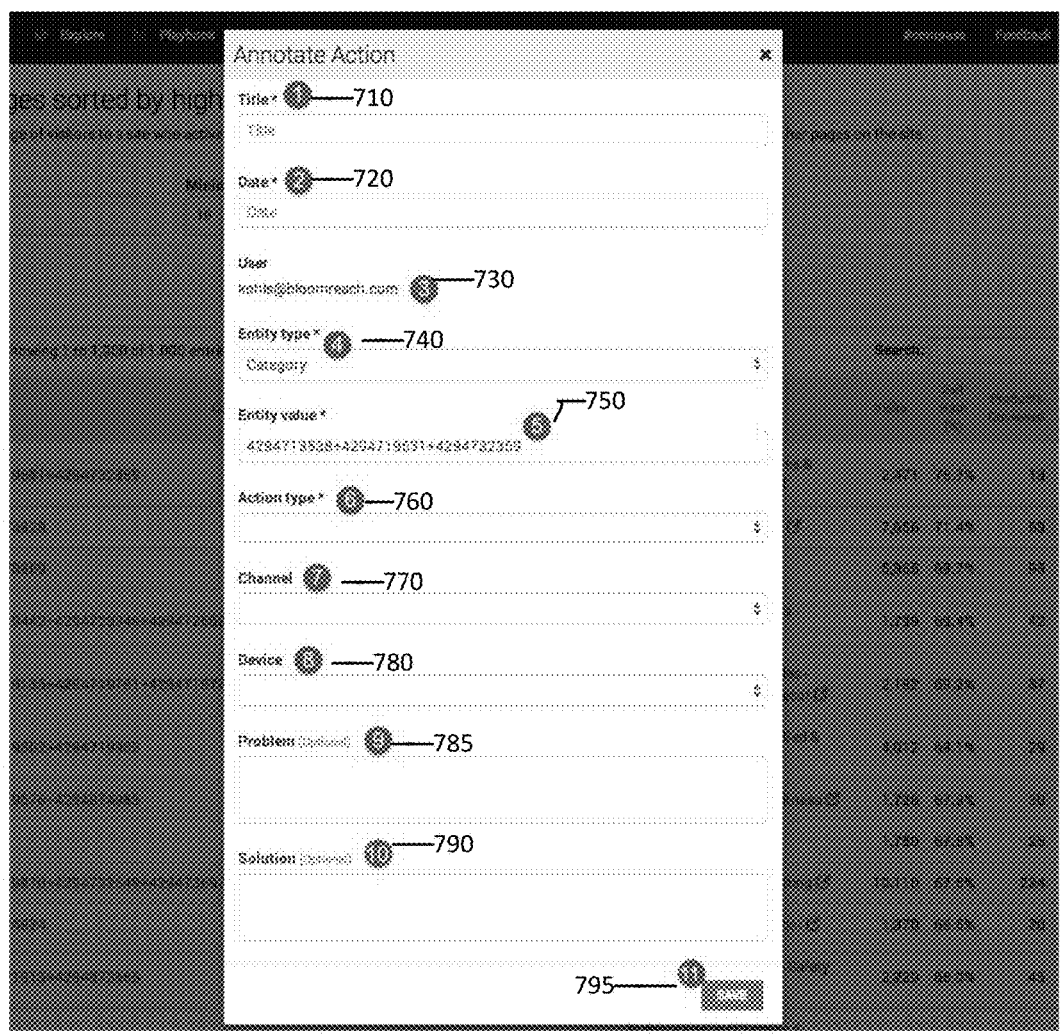
FIG. 7 is a screen diagram illustrating a user interface of an annotate action generated by the insights for web service providers system in accordance with some embodiments.

FIG. 7 is a screen diagram illustrating a user interface of an annotate action generated by the insights for web service providers system in accordance with some embodiments. For example, the insights for web services system can be implemented as similarly described above with respect to the service/system for providing insights for web service providers as shown in FIGS. 1-3.

In one embodiment, after a user has decided to act on an opportunity based on the solutions provided in the dashboards, the user can track an impact of that action using an Annotate feature (e.g., an annotate action feature for tracking activity and measuring impact of actions). In an example implementation, to access the annotate feature of Compass, a user can select an opportunity and then the "More Insights" feature is presented. The user can then select "Annotate" and then a form that is pre-populated with the details of the action is presented. The user can use the drop-down menu and text boxes to add in details about the action being taken by the user, such as shown in FIG. 7 and further described below.

Referring to screen 700 of FIG. 7, at 710, a title field is provided for entering a descriptive name to the action. At 720, a date field is provided for selecting/entering a date to indicate a date of the action. At 730, a user identifier is shown to indicate a user name/login email address of the current user performing the action. At 740, an entity type is provided to select whether the user is acting on a brand, category, product, or query. At 750, an entity value is provided (e.g., an entity value can be automatically populated based on the opportunity being acted upon). At 760, an action type field is provided to select how the user is acting through on site changes or marketing activities (e.g., a user can use the "other" section to fill in another action type). At 770, a channel field is provided for selecting which marketing channel the user is acting upon. At 780, a device field is provided to select a device (e.g., to indicate if actions are taken on a desktop device, a mobile device, or a tablet device, etc.). At 785 and at 790, optional problem and solution fields are provided for entering more details regarding the problem and solution that the user's action is attempting to address by the action. At 795, the user can select the save button to save the annotated action to the user's activity stream.

Understanding the Business Impact of Actions by Tracking Performance

Figure 8:
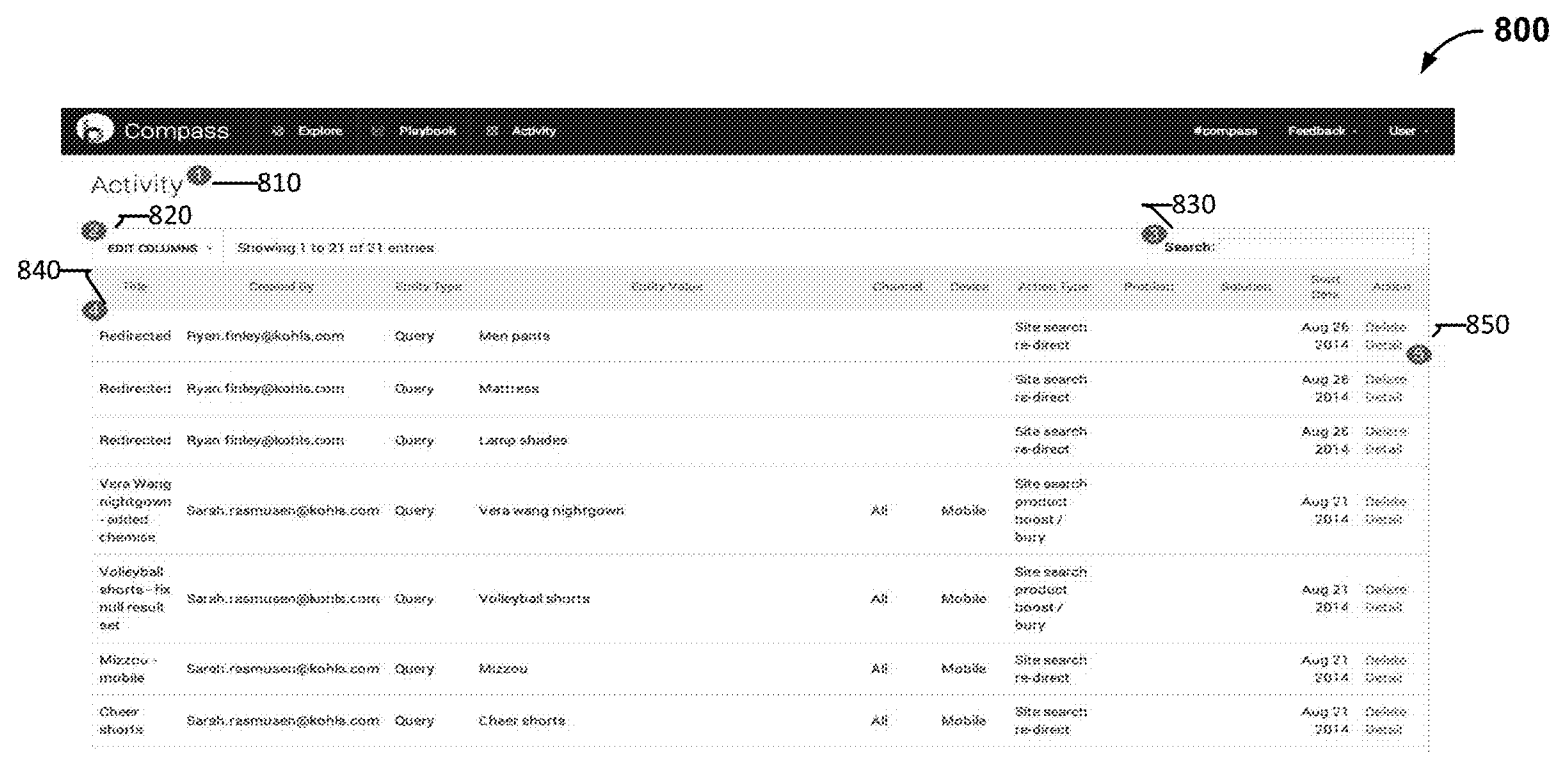

FIG. 8 is a screen diagram illustrating a user interface for viewing past actions and tracking their performance generated by the insights for web service providers system in accordance with some embodiments. For example, the insights for web services system can be implemented as similarly described above with respect to the service providers for providing insights for web service/system as shown in FIGS. 1-3.

In one embodiment, after the user has annotated the user's actions, the user can track the performance of the web site based on the user's actions. In an example implementation, to access the view past actions and their performance feature of Compass, a user can use the top-level navigation to select Activity as shown in FIG. 4. A user can narrow results by using the search box (e.g., typing into the search box) or filtering (e.g., selecting a column header to either sort or filter) as shown in FIG. 8 as further described below. For example, the table data provides an overview of actions taken. The user can also select Detail on the right side of the corresponding action to see the specific details for a given action (e.g., adjust the data by using the "Graph Settings" dropdown menu on the right-hand side of the graph; and/or compare the change to a baseline on the site by selecting the "+" button next to "Target Entities" and entering in a product ID, category ID, or query to compare like entities to each other; for example, a user can compare the results of an action on a category page to another category page, and a product page to another product page, such as shown in FIG. 9A).

Referring to screen 800 of FIG. 8, at 810, an activity interface screen is shown for tracking activities performed by a user using Compass. At 820, a user can edit columns by selecting from a dropdown menu to adjust columns in the table/chart of the activity interface screen. At 830, a search box is provided for searching across all of the user's activities by the user ID (e.g., user name, login, email address, etc.) of the user who acted, the title, and more. At 840, top level column headers are provided to reflect the columns selected by "Edit Columns" (e.g., clicking the title will allow a user to sort or filter using smart, dynamic filters). At 850, the details of the action(s) can be selected to find detailed information regarding the results of the user's action, such as shown in FIG. 9 and further described below.

Figure 9A:
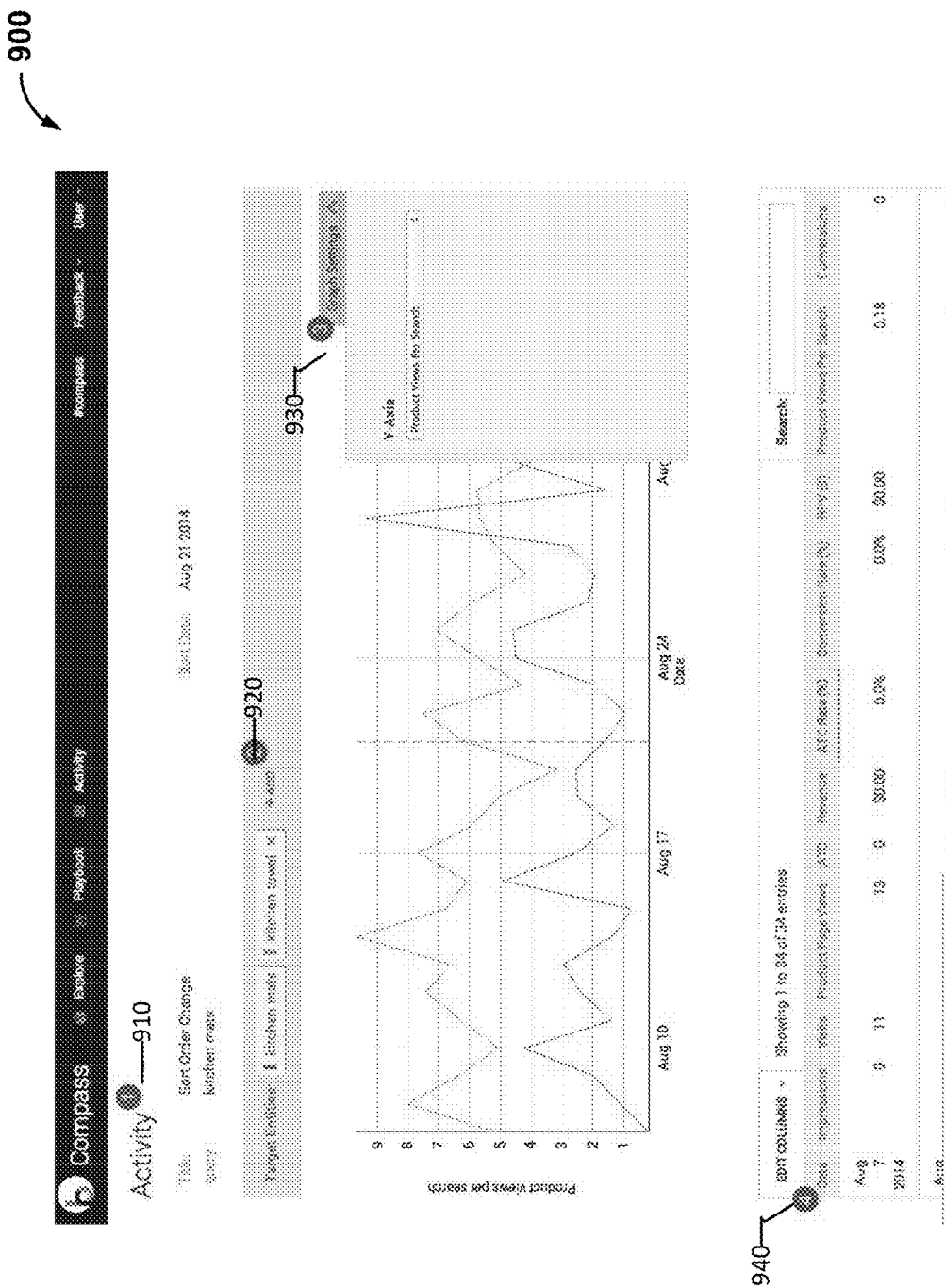
FIG. 9A is a screen diagram illustrating a user interface for a detailed view of past actions and tracking their performance generated by the insights for web service providers system in accordance with some embodiments.
Figure 9B:
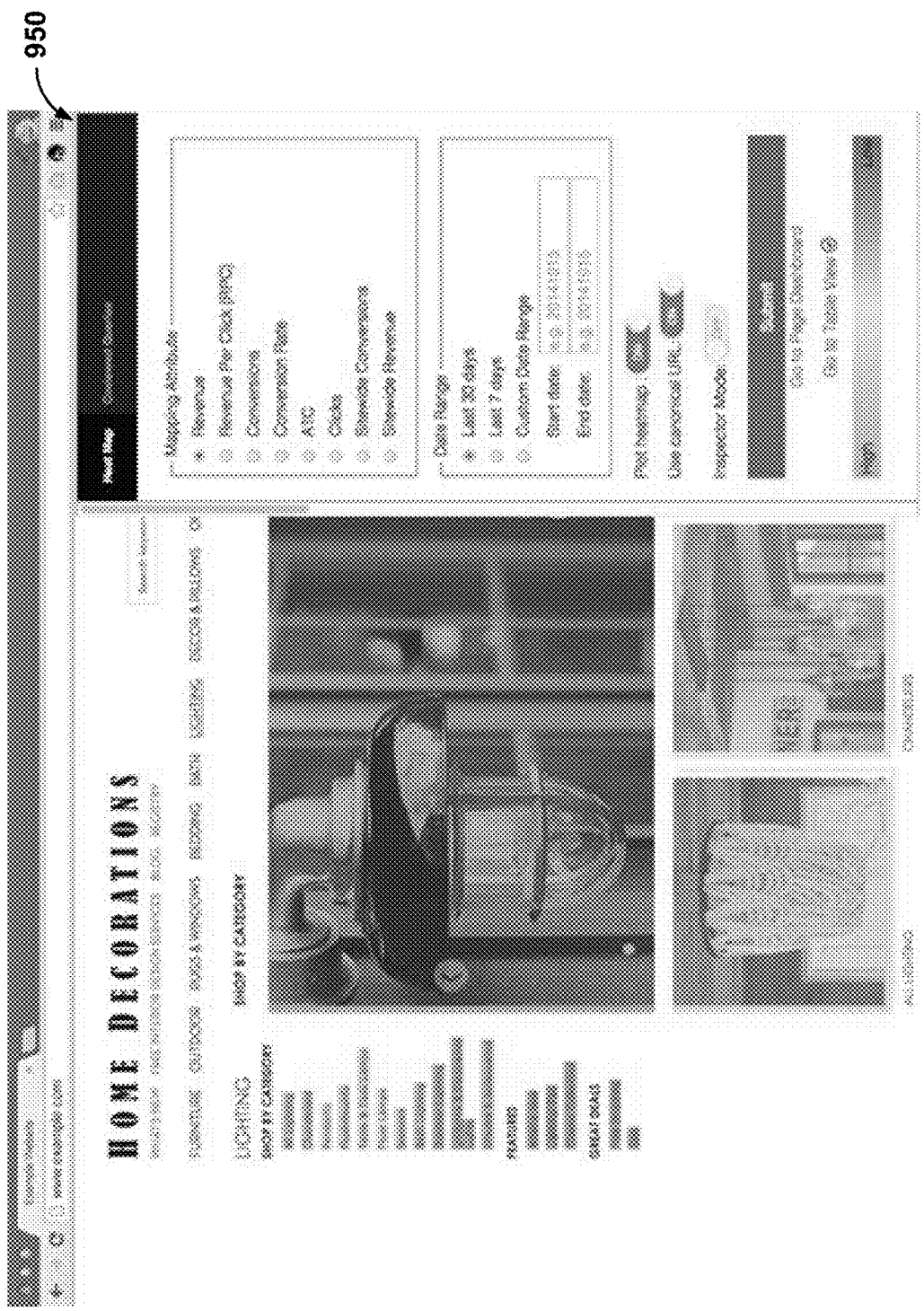
FIG. 9B is a screen diagram illustrating a user interface for a heat map graphic visualization in accordance with some embodiments.

FIG. 9A is a screen diagram illustrating a user interface for a detailed view of past actions and tracking their performance generated by the insights for web service providers system in accordance with some embodiments. For example, the insights for web services system can be implemented as similarly described above with respect to the service providers for providing insights for web service/system as shown in FIGS. 1-3.

Referring to screen 900 of FIG. 9A, at 910, another activity interface screen is shown for a detailed view of tracked activities performed by a user using Compass. For example, this screen can provide a detailed view of a particular action (e.g., details of a particular action selected by the user) from the Activity screen shown in FIG. 8. Action details can include a title, an action type (e.g., query, category, etc.), and start date as shown at the top of the example detailed activity screen of FIG. 9.

At 920, a comparison bar is provided for adding additional entities for comparison. In this example, the first entity is the one the action was taken against. Any following entities can be added for comparison (e.g., and color coded in the chart, such as to compare similar entities, such as different queries, different categories, etc.).

At 930, a graph settings selector is shown. For example, the user can choose to change values for the trended data in the graph. In some cases, if there is a low volume of many actions taken, an engagement metrics such as exit rate, product views per search, and ATC rate can be used.

At 940, a detailed table of various metrics is provided for the selected date range, such as to show daily data for the main entity the action was taken against (e.g., in this example, it is for the query "kitchen mats").

For example, additional metrics can be computed including total dollar impact of change, days elapsed since change, total visits impacted, and/or various other metrics can be computed.

In an example implementation, part of the front-end of the solution can also visualize the data (e.g., in Compass) in line with the web site as an overlay upon the web site. As an example, such graphic visualizations can include heat map related graphic visualizations.

With this kind of implementation of a sidebar, it becomes a quick and easy interaction to see the data highlighted beside the page. For example, to overlay the heat map, the user can simply select metrics related to each link on the page, the date ranges, and then highlight the links on the site based on the selected metric and the color scale, such as shown at 950 in FIG. 9B providing a screen diagram illustrating a user interface for a heat map graphic visualization in accordance with some embodiments.

Figure 9C:
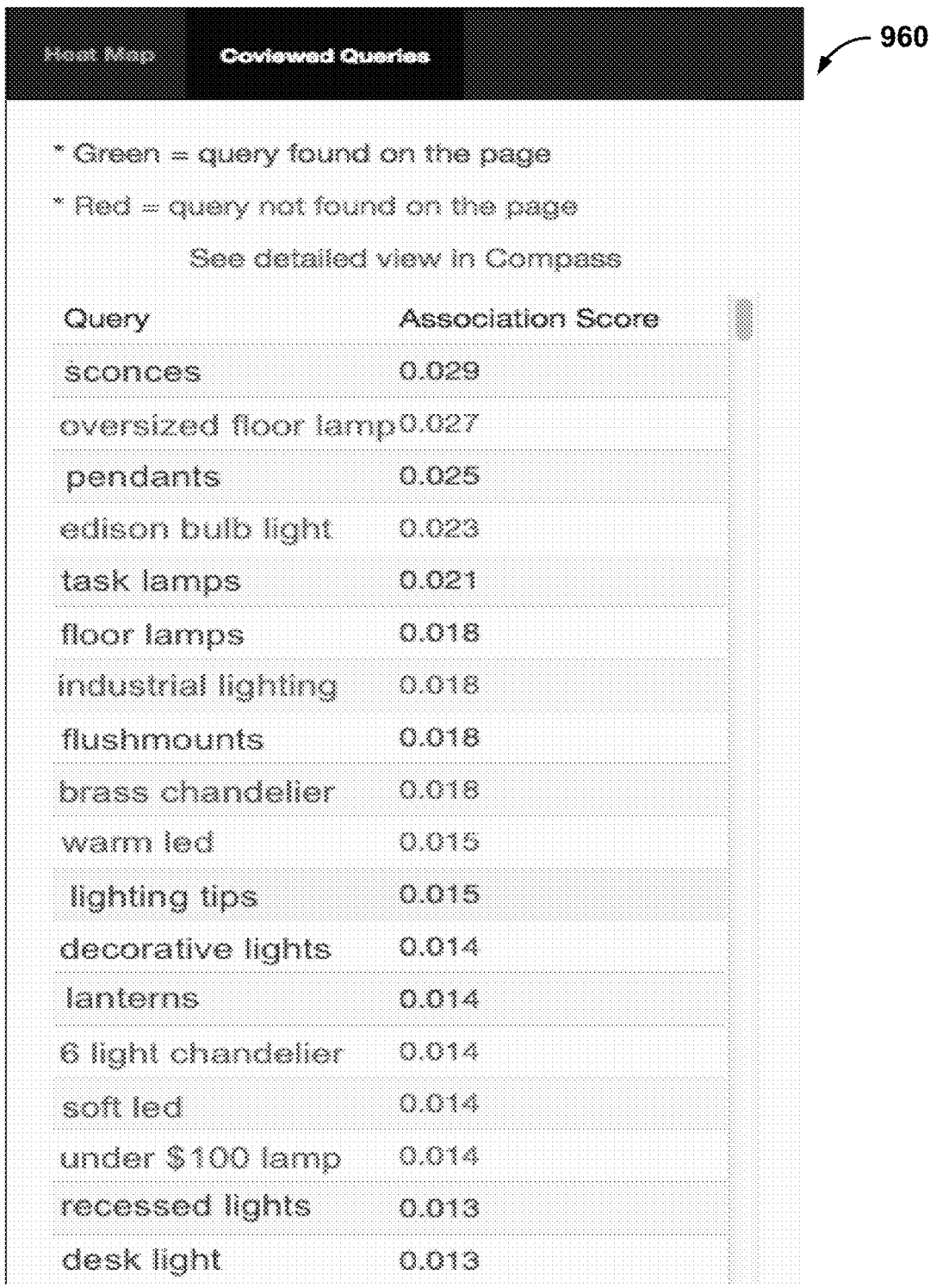
FIG. 9C is a screen diagram illustrating a user interface for providing a detailed view of coviewed queries in accordance with some embodiments.

FIG. 9C is a screen diagram illustrating a user interface for providing a detailed view of coviewed queries in accordance with some embodiments. For example, other tabs can show relevant association score data for associated products, queries, links, and/or other associations, such as shown the screen diagram at 960 in FIG. 9C. In this example, the associated queries with the page are shown along with the association score calculated using the above-described techniques. There can be various interactivity between this data (e.g., if coviewed query content is shown, it can be highlighted red (or using another visual/graphical indicator) if the text content does not exist on the page, and highlighted green (or using another visual/graphical indicator) if it does). Thus, in the quick glance the user can see content that might be missing from the page, which is causing users to abandon the page and use the site search box, which is causing the user to take extra steps to get to the content he/she is looking for.

Figure 10:
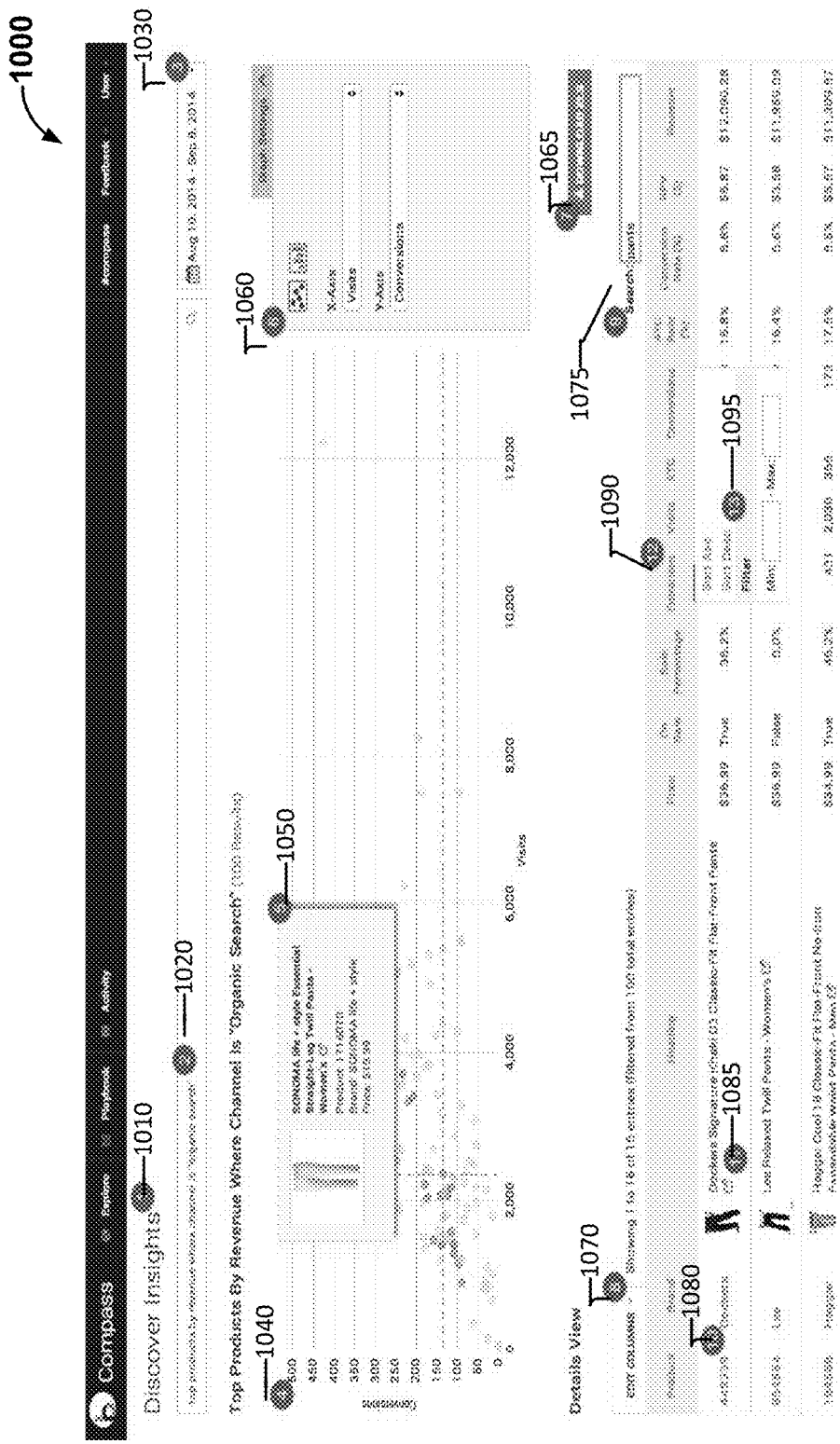
FIG. 10 is a screen diagram illustrating a user interface for discovering insights based on natural language queries generated by the insights for web service providers system in accordance with some embodiments.

Overview of a Discovering Insights Interface—Querying Monitored Web Site Performance Data Based on Natural Language Queries FIG. 10 is a screen diagram illustrating a user interface for discovering insights based on natural language queries generated by the insights for web service providers system in accordance with some embodiments. For example, the insights for web services system can be implemented as similarly described above with respect to the service providers for providing insights for web service/system as shown in FIGS. 1-3.

Referring to screen 1000 of FIG. 10, at 1010, a discover insights interface screen is shown for querying monitored web site performance data based on natural language queries using Compass. At 1020, a search box is provided in which a user can type a natural language query. In one embodiment, the insights for web service providers system automatically generates suggested queries for the user by generating and presenting autofill options to the user in the search box to help guide the user in creating queries (e.g., that can be translated for searching both structured and unstructured data sources for web site performance related data). For example, the insights for web service providers system can implement an autosuggestion engine to facilitate free form search that can be translated into structured queries to search structured data sources, such as further described below with respect to FIG. 11.

At 1030, a date field is provided to allow the user to select a date range or to enter a customized date range. At 1040, a graph is provided to show a visualization of the queried web site performance data (e.g., dotted lines can be used to indicate the average of each metric when viewing a scatterplot graph). At 1050, data detail is presented when a user selects (e.g., hovers a cursor/mouse/finger over) an individual bar or scatterplot dot in the graph to see more details and/or an image of the product in question (e.g., and, in an example implementation, a user can click to trigger a "More Insights" menu to guide the user to a solution/recommendation(s)). At 1060, graph settings are presented in which a user can customize the graph type and metrics displayed in the graph (e.g., a scatterplot graph can be used to identify the relationship between metrics and areas of optimization). At 1065, a download option (e.g., link/button) is provided to allow the user to download the table/graph data shown at 1040 (e.g., in a CSV or other file/data format).

At 1070, the user can select from the dropdown menu to adjust the columns in the chart shown in a bottom portion of the discover insights screen. At 1075, another search box is provided in which the user can search within the URL, query, and/or heading. At 1080, data details are provided that allow the user to select the links (e.g., hyperlinks) to open the "More Insights" feature to guide the user to solutions. At 1085, product details are provided, in which the user can select an image and link icon to open a live page of the monitored web site in the user's browser. At 1090, column headers are provided that describe the respective columns in the table. At 1095, column refinement can be performed by selecting a column title to sort and filter.

Translating a Natural Language Query Into a Structured Query Using a Context Free Grammar (CFG)

In one embodiment, the insights for web service providers system translates a natural language query into a structured query (e.g., a Structured Query Language (SQL) database query or other structured language query) using a Context Free Grammar (CFG). For example, a natural language query can be translated to perform an SQL query in a relational database that is a structured data store of monitored web site performance data, such as described herein.

FIGS. 16A-E are screen diagrams illustrating a user interface for completing a query using a Context Free Grammar (CFG) in accordance with some embodiments. For example, FIGS. 16A, 16B, 16C, 16D, and 16E show how a user can complete a query using a Context Free Grammar (CFG). As shown, as the user keeps typing in a query field (1602), the context free grammar offers completions for a valid statement that can be translated into a structured query to retrieve the relevant data (e.g., retrieve the relevant insights using the tool based on the user entered query). At 1600, a tool prompts the user with suggestions for what to type in the discover insights user interface (e.g., prior to any text entered by the user in the query field at 1602). At 1610, as the user types/enters an initial set of text in the query field, the tool automatically suggests valid next items to type into the form to complete the query (e.g., in this example, the user entered the text of "Top", and various next items are suggested, including "Top Products", "Top Queries", "Top Pages", and various other suggestions are shown). At 1620, the tool also provides an ability to refine what data/insights a user is looking by automatically suggesting more specific queries in the form to complete the query (e.g., in this example, the user entered/selected the text of "Top Page", and various next items are suggested, including "Top 100 Pages", "Top 100 pages where channel is 'organic search'", and various other specific suggestions are shown), which is similarly shown at 1630 and 1640 as the tool continues to facilitate a more refined query to enable the user to effectively and efficiently query for their desired data/insights. The tool facilitates such access to the data/insights without requiring the user to enter the query for such data/insights using a structured query, as further described below.

Generally, SQL is a query language specifically designed for managing data stored in a relational database management system (RDBMS). In one embodiment, the monitored web site performance data (e.g., performance data and fact tables) is stored in a relational database (e.g., a parallel relational database). In order to enable easy access to the data, a much simpler query language that is closer to a natural language is supported.

For example, the simpler query language can be encoded using a Context Free Grammar (CFG). Generally, a context free grammar is a formal grammar with specific rules to query data from the SQL table. In an example implementation, a context free grammar specific to the SQL schema used by Compass is implemented to facilitate translation of natural language queries to SQL queries of the monitored web site performance data (e.g., performance data and fact tables) in Compass.

FIG. 11 is an example table that lists customers and their geographic locations along with the revenue from each customer. Given the existence of a CFG for generic SQL queries, it can be shown that for any SQL schema, a specific CFG can be written that generates queries in natural language that can be mapped to the specific SQL queries for that schema. For example, consider table 1100 as shown in FIG. 11. Table 1100 is a table (e.g., a customers table) that lists customers and their geographic locations along with the revenue from that particular customer.

One possible query is, for example, "who is my top customer from any state." A corresponding SQL query for this query is as follows:
select * from customers where state='% given state %' order by revenue DESC LIMIT 1

However, a CFG for this query can be written/coded as follows:
Set of Symbols: {"Top", "Customers", "by", "Revenue", "where", "state is", "% state name %"}
Production rules:
Top→Customers
Customers→Null, by
by→Revenue
Revenue→null, where
where→state is
state is→% state name %

The above CFG can generate multiple queries, such as the following:
Top Customers
Top Customers by Revenue
Top Customers by Revenue where state is "% state name %"

As such, it is generally easier for typical users to query the web site performance data using queries generated by the above-described example CFG than for users to perform the same queries using SQL.

A sample database schema for co-visit data is shown below.
create table ${merchant}_covisit_all (
source_entity_value varchar(1600) not null distkey,
source_entity_type int,
source_event_type int,
source_global_frequency int,
target_event_type int,
target_entity_type int,
target_entity_value varchar(1600),
target_global_frequency int,
target_pairwise_frequency int
);

In one embodiment, an association score can be calculated from this table for any combination of entities.

Figure 12:
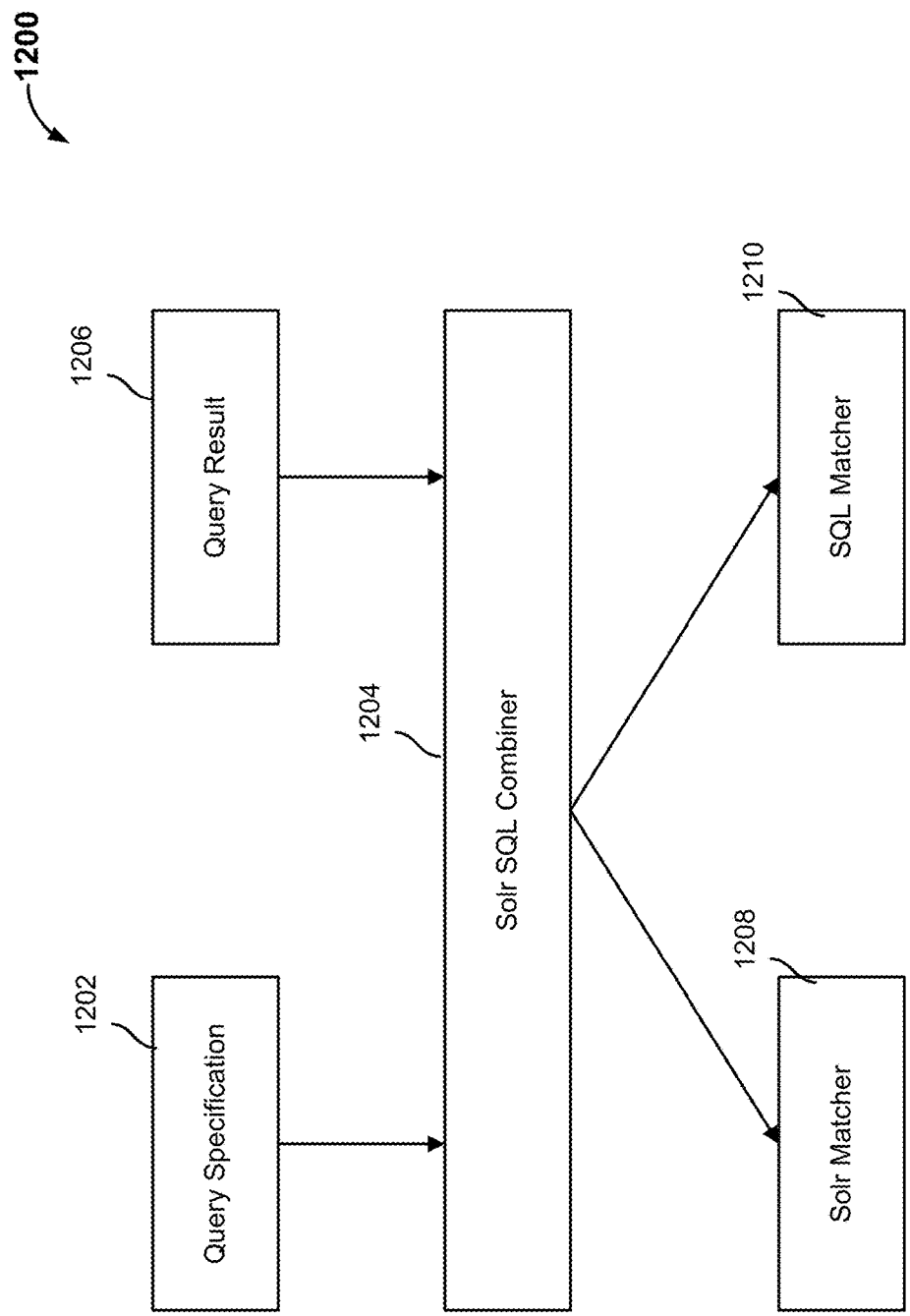
FIG. 12 is a functional block diagram illustrating an architecture of a system environment for querying structured and unstructured data queries at scale based on natural language queries in accordance with some embodiments.

For example, pairs of these entities can be used to uncover useful data. Example use cases are illustrated below.
query→product output indicates products that are most closely associated with the query ranked by highest association score:

product→product→cross promote on site or offsite, page creation, in-store promotions, navigation categories→product→ranking categories→categories→better category tree product→query→site search, intent query→product co-visit data→understand what people are looking for site search results query→query co-visit data→understand what are related terms System Architecture for Querying Structured and Unstructured Data Queries at Scale Based on Natural Language Queries FIG. 12 is a functional block diagram illustrating an architecture of a system environment for querying structured and unstructured data queries at scale based on natural language queries in accordance with some embodiments. For example, example system architecture 1200 as similarly described above with respect to the insights for web services system can be implemented as similarly described above with respect to the service/system for providing insights for web service providers as shown in FIGS. 1-3.

For example, example system architecture 1200 is designed to allow structured and unstructured searches of performance data monitored and stored using the system/service for providing insights for web services. An example query is as follows: performance of "dress" products. In this example query, the system/service can search all unstructured data (e.g., stored in an unstructured data source(s)) about products to find which are related to "dress" and then search structured data (e.g., stored in a structured data source(s)), such as revenue associated with such products. As such, in this example, a capability to join results from a text search engine (Solr) and SQL database to answer queries that involved both free text search and structured data is provided using the disclosed system architecture 1200.

Referring to FIG. 12, a query specification 1202 (e.g., QuerySpec, which can be implemented as a CFG specification, such as similarly described above) is provided as input to a Solr SQL combiner 1204 and also receives a query result 1206 (e.g., a user inputted natural language query). The query specification is a combination of the various query parameters, including SQL query and free text query. For example, a query specification could include the SQL query to take the products returned by a text query (e.g., fetch all "red shoes" products) and sort them by revenue over the last 30 days. The text query can be specified as a string value or as a result of an arbitrary SQL query. As such, this allows for multiple free text searches to be sent to a Solr data store in one query specification (e.g., CFG QuerySpec).

As also shown in FIG. 12, the free text query can be sent from Solr SQL combiner 1204 to Solr Matcher 1208 (e.g., a Solr search of a Solr data store, which is an indexed unstructured data store). The SQL query can be sent from Solr SQL combiner 1204 to SQL matcher 1210 (e.g., for querying an SQL database, which is a structured data store). In an example implementation, a temporary (temp) table can be used to store results from the Solr data store. Also, arbitrary joins between Solr and SQL can be supported by allowing the join query as part of input to the QuerySpec. Connection pooling can also be supported in this example implementation and retries can similarly be supported in this example implementation (e.g., supporting retry can be when a query fails due to a closed database connection after a long idle time).

As an example use case scenario, assume that a user wants to perform a search for revenue for web pages that include a term "dress." A text search engine for searching an unstructured data source (e.g., Solr search) and structured data source (e.g., SQL database) can be used to search both for web pages that include the term "dress." In this example, the N number of web pages that include the term "dress" can be identified, and then an SQL query can be generated to determine revenue associated with each of those N number of web pages that include the term "dress."

Example Processes for Providing Insights for Web Service Providers

Figure 13:
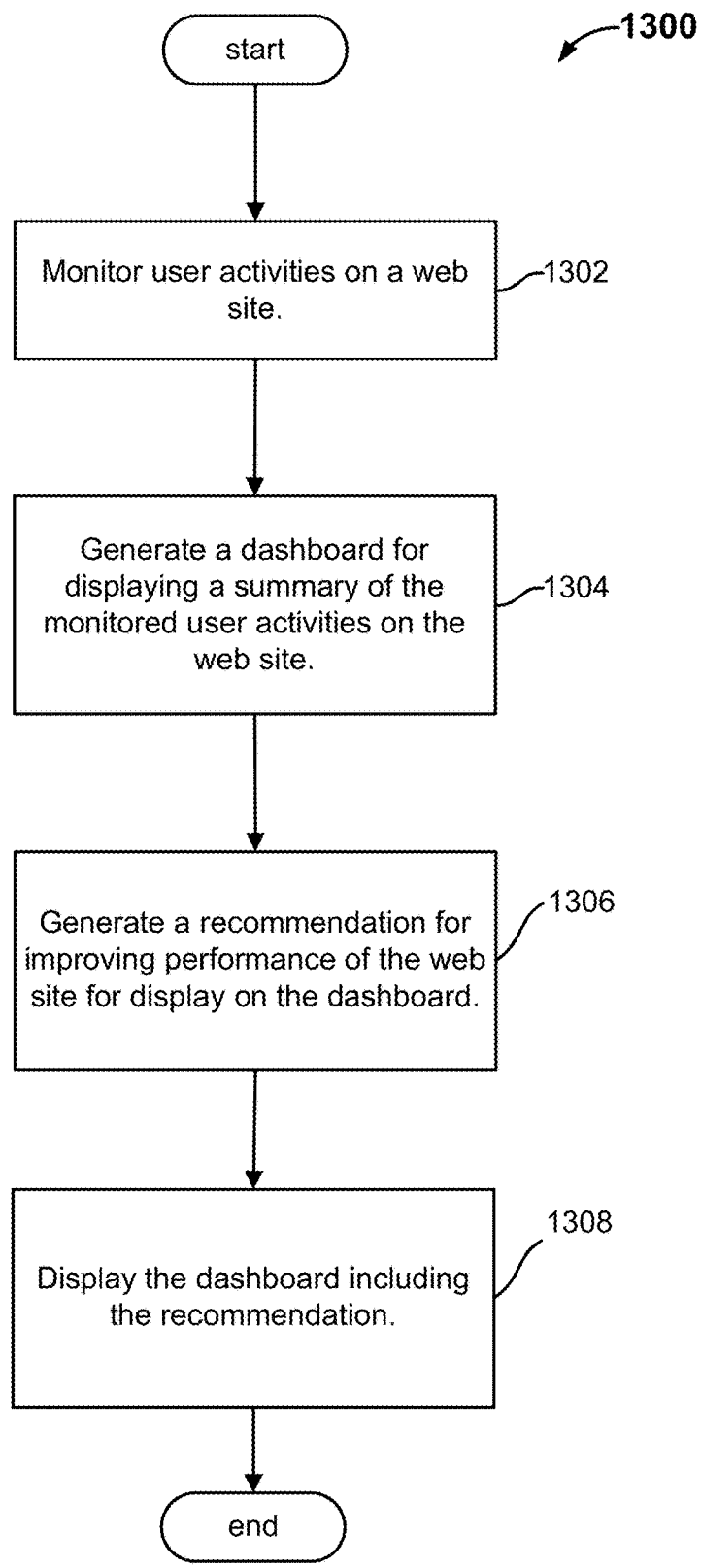
FIG. 13 is a flow diagram illustrating a process for providing insights for web service providers in accordance with some embodiments.

FIG. 13 is a flow diagram illustrating a process for providing insights for web service providers in accordance with some embodiments. In one embodiment, a process 1300 is performed by an insights for web service providers, such as described above with respect to FIGS. 1-3.

The process begins at 1302. At 1302, user activities on a web site are monitored. For example, pixel log techniques can be performed to monitor various user activities on the web site (e.g., a merchant/e-commerce web site or other web site), such as similarly described above.

At 1304, a dashboard for displaying a summary of the monitored user activities on the web site is generated. For example, the dashboard can be generated based on a predefined report and/or user customized criteria for a report, such as similarly described above.

At 1306, a recommendation for improving performance of the web site for display on the dashboard is generated. For example, the recommendation can be a recommended action to improve site search on the web site, to improve navigation on the web site, to enhance thin content on a page on the web site, and/or other actions for improving web site performance, such as similarly described above.

At 1308, the dashboard is displayed including the recommendation. For example, the dashboard can be displayed as a Graphical User Interface (GUI) using a front-end server (e.g., a web server), such as similarly described above.

Figure 14:
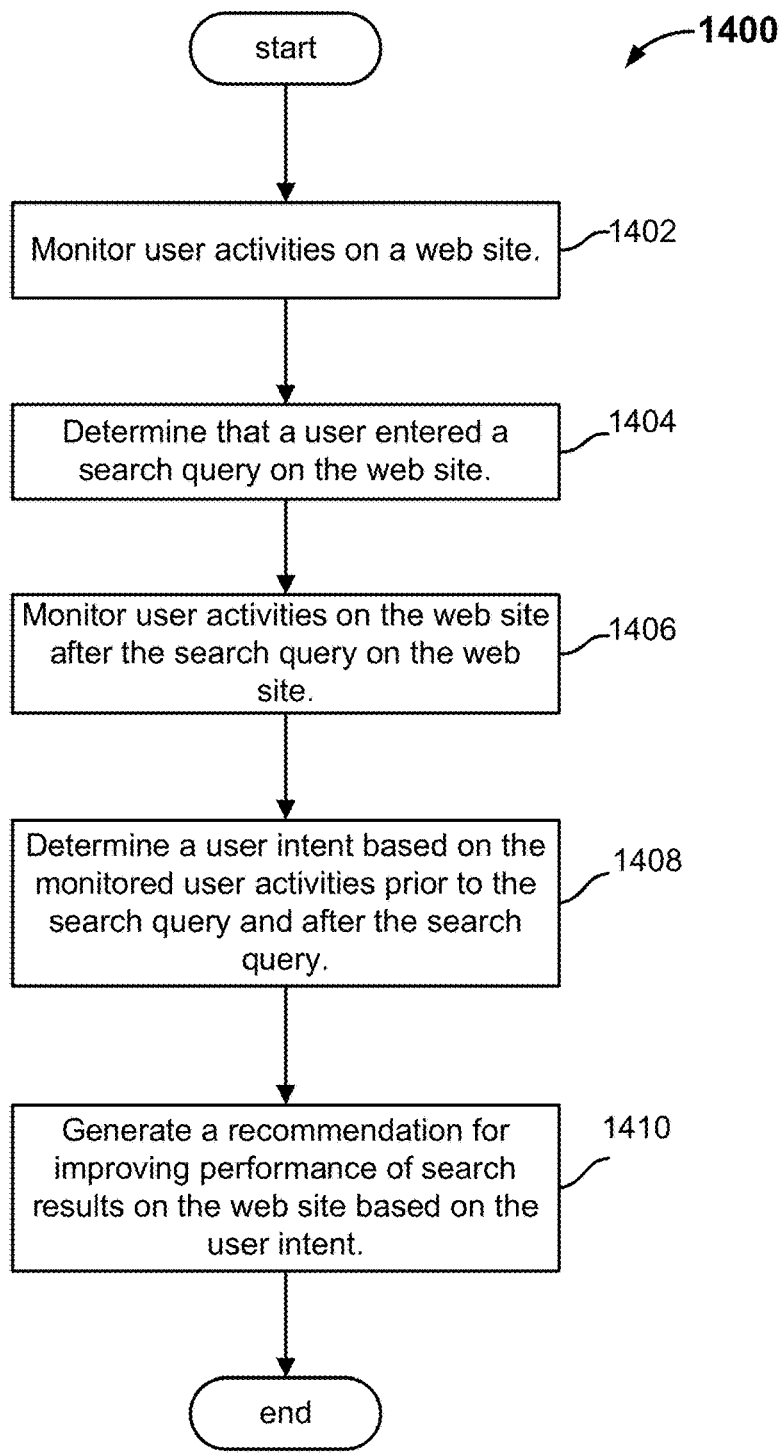
FIG. 14 is another flow diagram illustrating a process for providing insights for web service providers in accordance with some embodiments.

FIG. 14 is another flow diagram illustrating a process for providing insights for web service providers in accordance with some embodiments. In one embodiment, a process 1400 is performed by an insights for web service providers, such as described above with respect to FIGS. 1-3.

The process begins at 1402. At 1402, user activities on a web site are monitored. For example, pixel log techniques can be performed to monitor various user activities on the web site (e.g., a merchant/e-commerce web site or other web site), such as similarly described above.

At 1404, whether a user entered a search query on the web site is determined. For example, pixel log techniques can be performed to detect whether a user entered a search query on the monitored web site, such as similarly described above.

At 1406, user activities on the web site after the search query are monitored. For example, pixel log techniques can be performed to monitor various user activities on the web site after the user entered the search query, such as similarly described above.

At 1408, a user intent based on the monitored user activities prior to the search query and after the search query is determined. For example, co-visit analysis techniques can be performed to determine the user intent based on the monitored user activities prior to the search query and after the search query, such as similarly described above.

At 1410, a recommendation for improving performance of search results on the web site based on the user intent is generated. For example, co-visit analysis techniques can be applied to facilitate identifying an opportunity/recommendation for improving performance of search results on the web site based on the user intent, such as similarly described above.

Figure 15:
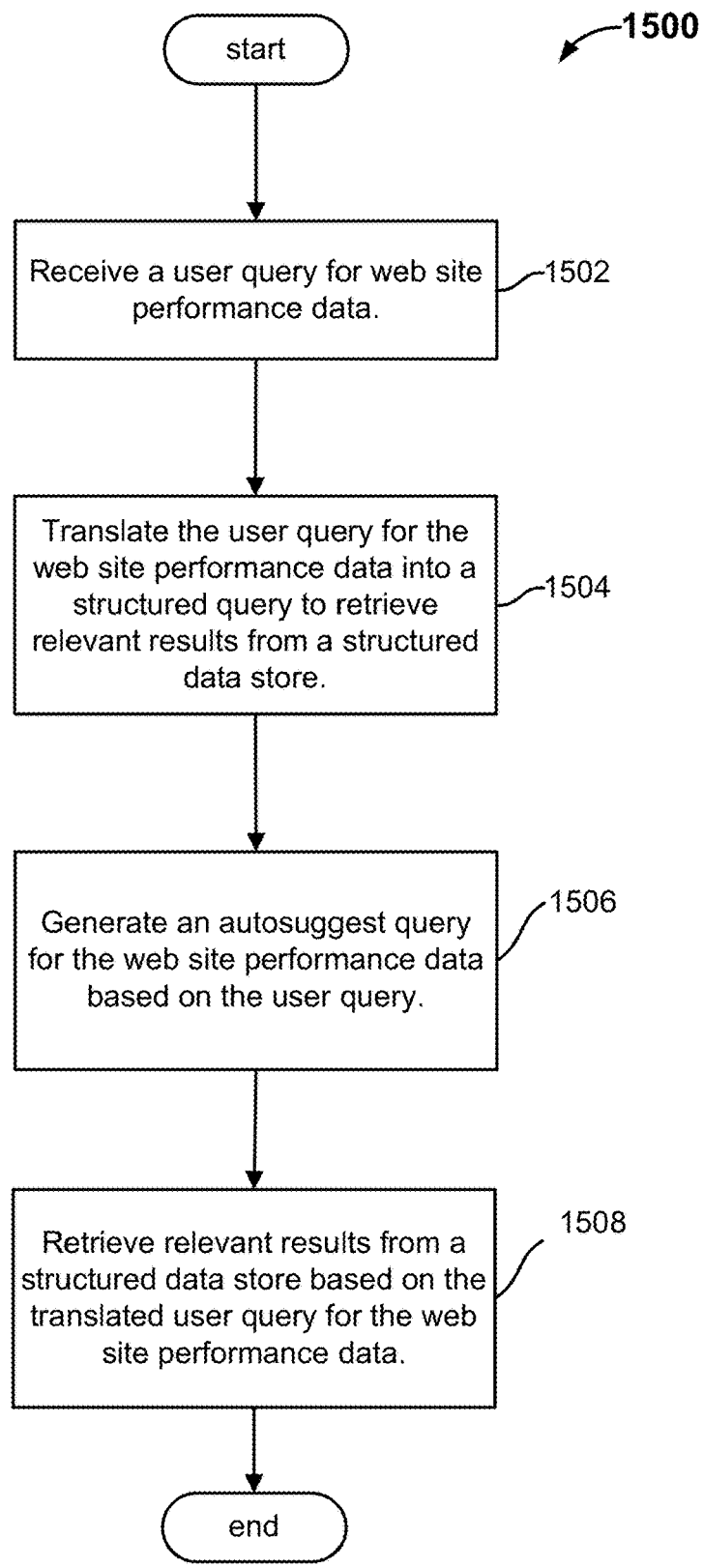
FIG. 15 is another flow diagram illustrating a process for providing insights for web service providers in accordance with some embodiments.
Figure 16A:
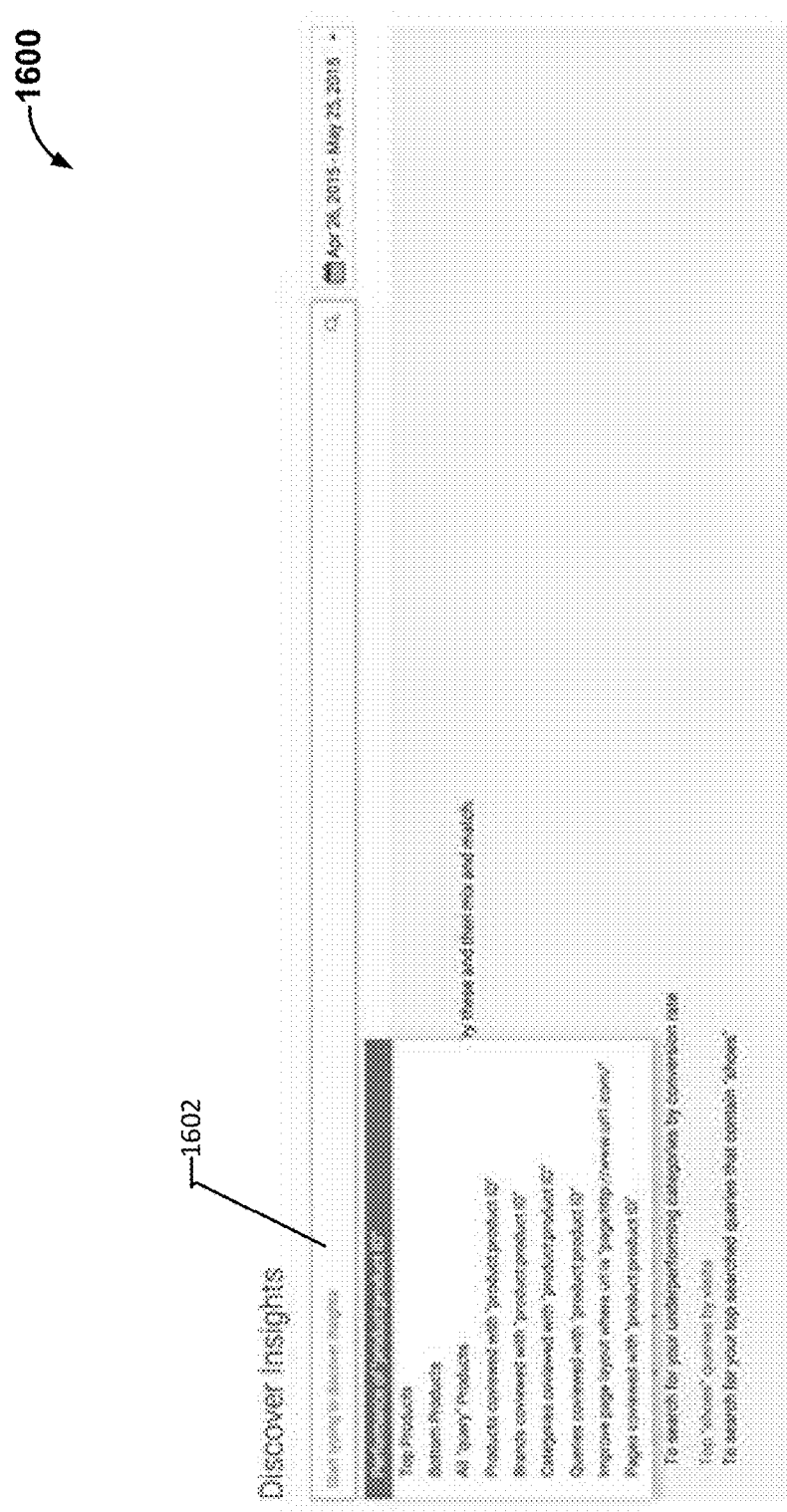
FIGS. 16A-E are screen diagrams illustrating a user interface for completing a query using a Context Free Grammar (CFG) in accordance with some embodiments.
Figure 16B:
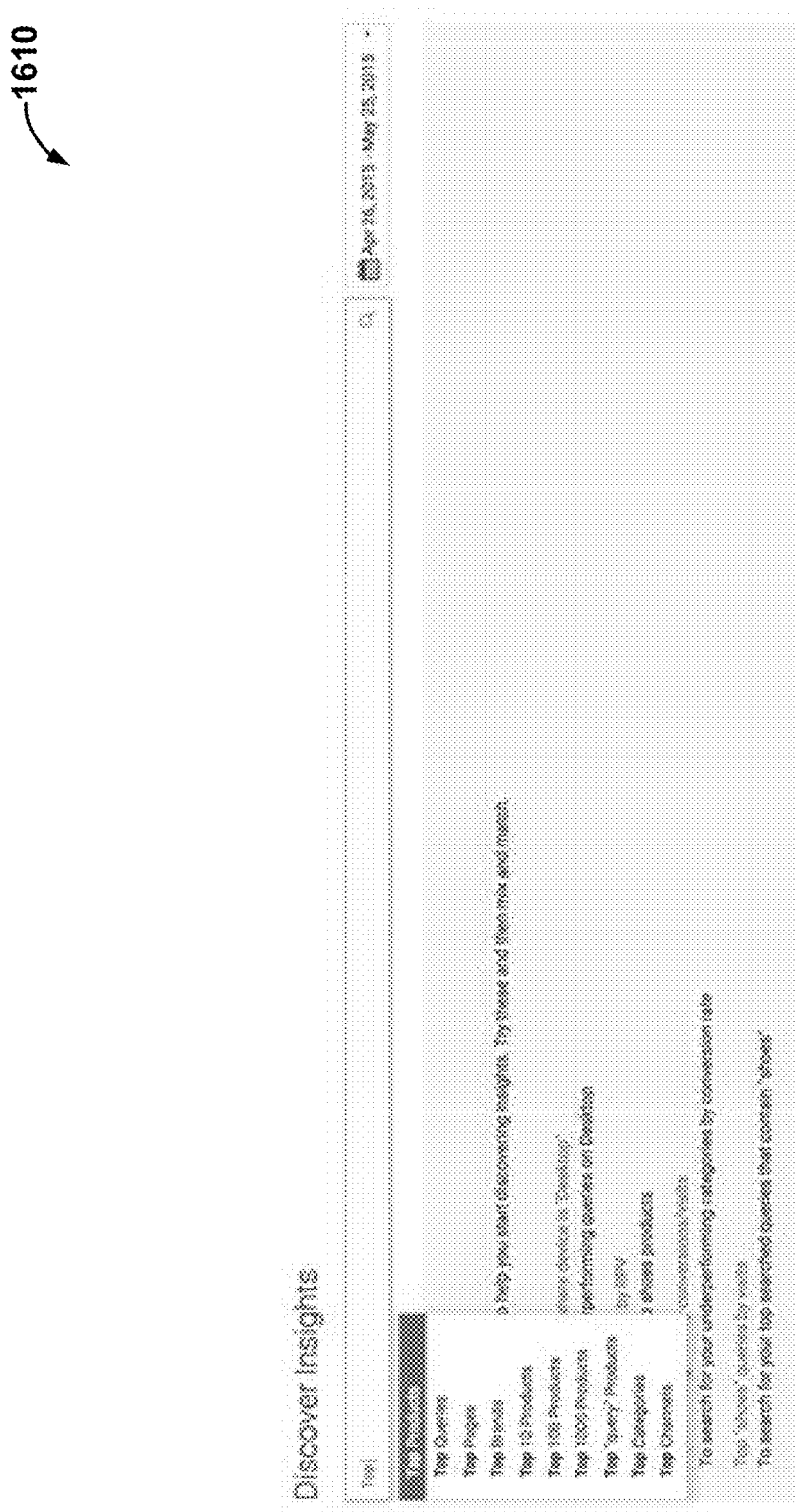
Figure 16C:
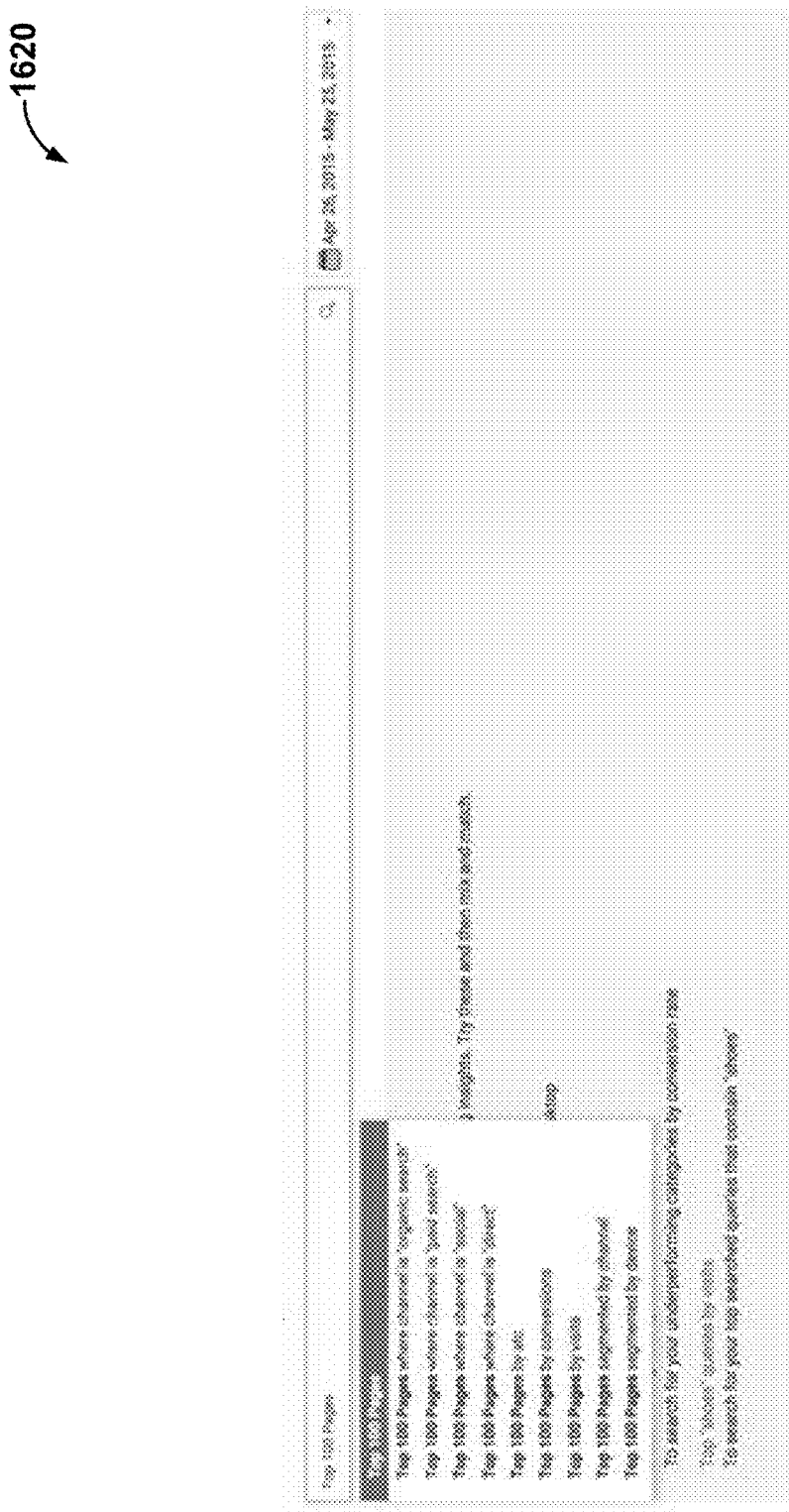
Figure 16D:
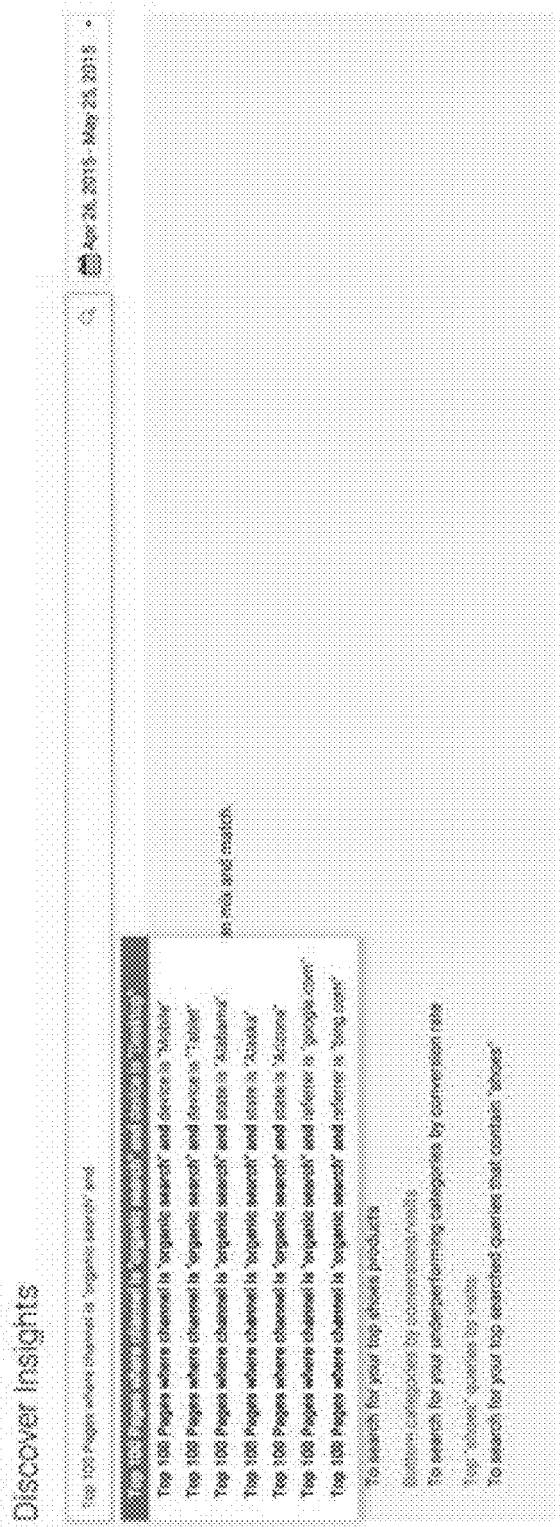
Figure 16E:
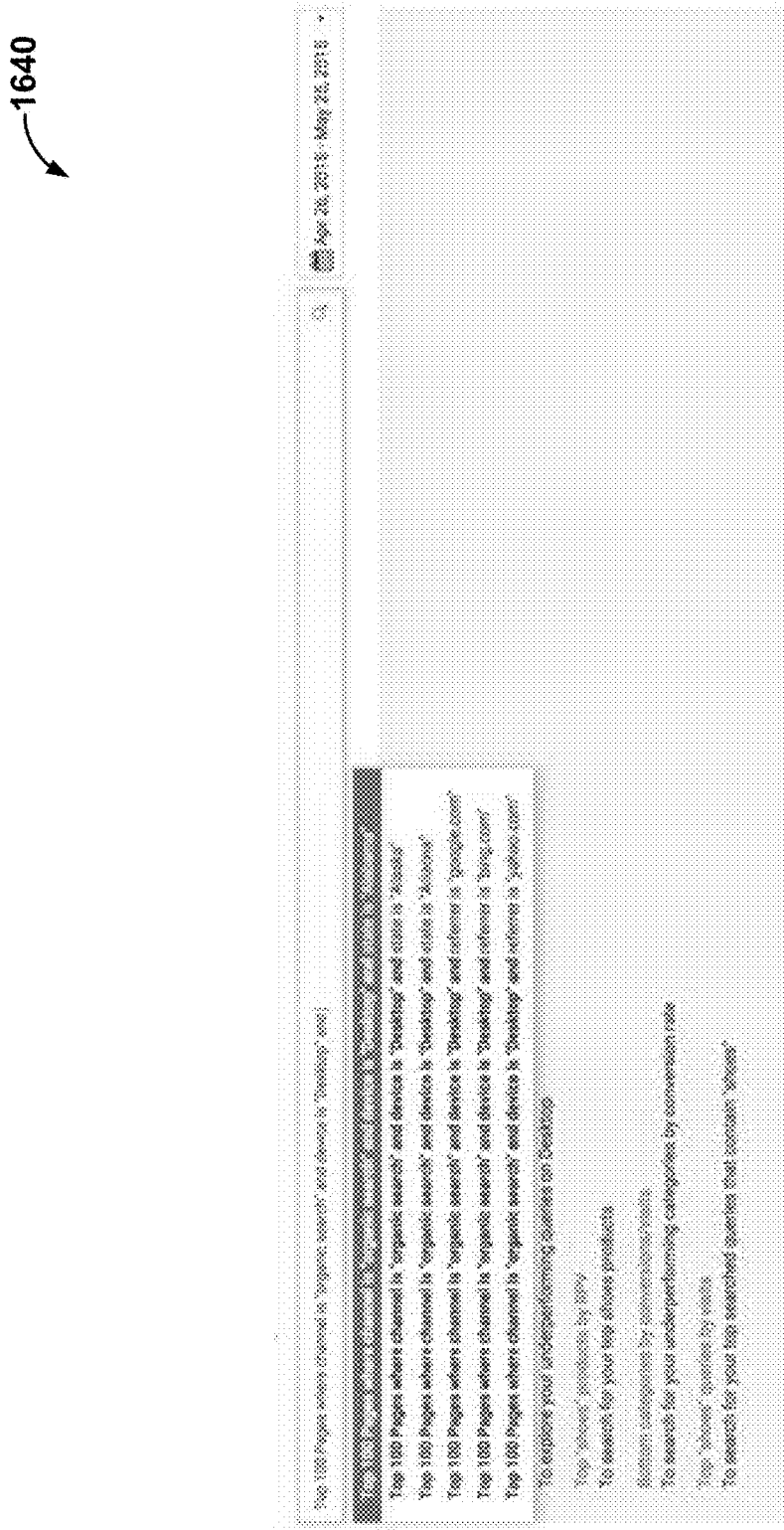

FIG. 15 is another flow diagram illustrating a process for providing insights for web service providers in accordance with some embodiments. In one embodiment, a process 1500 is performed by an insights for web service providers, such as described above with respect to FIGS. 1-3.

The process begins at 1502. At 1502, a user query for web site performance data is received. For example, the user query can be entered by a user as a natural language search query received at a front-end server of a service/system for providing insights for web service providers, such as similarly described above.

At 1504, the user query for the web site performance data is translated into a structured query to retrieve relevant results from a structured data store. For example, the user query can be translated from a natural language query into a structured query (e.g., SQL query) using a Context Free Grammar (CFG), such as similarly described above. The structured query can then be used to retrieve relevant results from a structured data store (e.g., SQL database).

At 1506, an autosuggest query for the web site performance data based on the user query is generated. For example, the autosuggest query can be displayed near the search box of the site search for the merchant web site, such as similarly described above.

At 1508, relevant results from a structured data store based on the translated user query for web site performance data are retrieved. For example, the relevant results can be communicated from the front-end server of a service/system for providing insights for web service providers (e.g., a web server) to a client device (e.g., executing a web browser), such as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing insights for web service providers, comprising:
 a processor configured to:
  monitor user activities on a web site, wherein the user activities include a source entity and a target entity, the source entity relating to user activities before an event, the target entity relating to user activities after the event;
  generate a dashboard for displaying a summary of the monitored user activities on the web site, comprising to:
   calculate a co-visit association score based on the user activities on the web site, comprising to:
    determine the co-visit association score based on a pairwise frequency of the source entity and the target entity, global frequency of the source entity, and global frequency of the target entity;
   in response to a determination that the co-visit association score satisfied a co-visit association score threshold, identify a product associated with the user activities on the web site;
  generate, based on the identified product, a recommendation for improving performance of the web site for display on the dashboard, wherein the recommendation includes an addition of products to a web page displayed on the web site, a placement of a link on a web page displayed on the web site, a promotion of a product to a web page displayed on the web site, or any combination thereof;
  automatically perform at least one of the recommendations for improving performance of the web site; and
  display the dashboard via a web site, wherein the dashboard includes a heat map that includes visual indicators based on a plurality of metrics associated with the performance of the web site, and wherein the dashboard further includes data presented in-line with the web site and displayed using visual indicators based on the content on a web page of the web site; and
 a memory coupled to the processor and configured to provide the processor with instructions.

2. The system recited in claim 1, wherein the processor is further configured to:
 display the dashboard.

3. The system recited in claim 1, wherein the processor is further configured to:
 display the dashboard via a web site.

4. A method of providing insights for web service providers, comprising:
 monitoring user activities on a web site, wherein the user activities include a source entity and a target entity, the source entity relating to user activities before an event, the target entity relating to user activities after the event;
 generating a dashboard for displaying a summary of the monitored user activities on the web site, comprising:
  calculating a co-visit association score based on the user activities on the web site, comprising:
   determining the co-visit association score based on a pairwise frequency of the source entity and the target entity, global frequency of the source entity, and global frequency of the target entity;
  in response to a determination that the co-visit association score satisfied a co-visit association score threshold, identify a product associated with the user activities on the web site;
 generating, based on the identified product, a recommendation for improving performance of the web site using a processor for display on the dashboard, wherein the recommendation includes an addition of products to a web page displayed on the web site, a placement of a link on a web page displayed on the web site, a promotion of a product to a web page displayed on the web site, or any combination thereof;
 automatically performing at least one of the recommendations for improving performance of the web site; and
 displaying the dashboard via a web site, wherein the dashboard includes a heat map that includes visual indicators based on a plurality of metrics associated with the performance of the web site, and wherein the dashboard further includes data presented in-line with the web site and displayed using visual indicators based on the content on a web page of the web site.

5. The method of claim 4, further comprising:
 displaying the dashboard.

6. The method of claim 4, further comprising:
 displaying the dashboard via a web site.

7. A computer program product for providing insights for web service providers, the computer program product being embodied in a tangible non-transitory computer readable storage medium and comprising computer instructions for:

monitoring user activities on a web site, wherein the user activities include a source entity and a target entity, the source entity relating to user activities before an event, the target entity relating to user activities after the event;

generating a dashboard for displaying a summary of the monitored user activities on the web site, comprising:
  calculating a co-visit association score based on the user activities on the web site, comprising:
    determining the co-visit association score based on a pairwise frequency of the source entity and the target entity, global frequency of the source entity, and global frequency of the target entity;
  in response to a determination that the co-visit association score satisfied a co-visit association score threshold, identifying a product associated with the user activities on the web site;
  generating, based on the identified product, a recommendation for improving performance of the web site for display on the dashboard, wherein the recommendation includes an addition of products to a web page displayed on the web site, a placement of a link on a web page displayed on the web site, a promotion of a product to a web page displayed on the web site, or any combination thereof;
  automatically performing at least one of the recommendations for improving performance of the web site; and
  displaying the dashboard via a web site, wherein the dashboard includes a heat map that includes visual indicators based on a plurality of metrics associated with the performance of the web site, and wherein the dashboard further includes data presented in-line with the web site and displayed using visual indicators based on the content on a web page of the web site.

8. The computer program product recited in claim 7, further comprising computer instructions for:
  displaying the dashboard.

9. The computer program product recited in claim 7, further comprising computer instructions for:
  displaying the dashboard via a web site.

10. A system for providing insights for web service providers, comprising:
  a processor configured to:
    monitor user activities on a web site prior to a user event on the web site, wherein the user event includes a search on the web site based on a user query, a view of a category page on the web site, an add to cart of a product on the web site, and/or a view of a product page on the web site;
    monitor user activities on the web site before and after the event on the web site, wherein the user activities include a source entity and a target entity, the source entity relating to user activities before the user event, the target entity relating to user activities after the user event;
    generate a recommendation for improving performance of the web site based on the monitored user activities prior to the event on the web site and after the event on the web site, comprising to:
      calculate a co-visit association score based on the user activities on the web site, comprising to:
        determine the co-visit association score based on a pairwise frequency of the source entity and the target entity, global frequency of the source entity, and global frequency of the target entity;
      in response to a determination that the co-visit association score satisfied a co-visit association score threshold, generate the recommendation based on a product associated with the user activities on the web site, wherein the recommendation includes an addition of products to a web page displayed on the web site, a placement of a link on a web page displayed on the web site, a promotion of a product to a web page displayed on the web site, or any combination thereof;
    automatically perform at least one of the recommendations for improving performance of the web site; and
    display a dashboard via a web site, wherein the dashboard includes a heat map that includes visual indicators based on a plurality of metrics associated with the performance of the web site, and wherein the dashboard further includes data presented in-line with the web site and displayed using visual indicators based on the content on a web page of the web site; and
  a memory coupled to the processor and configured to provide the processor with instructions.

11. The system recited in claim 10, wherein the processor is further configured to:
  determine a user intent based on the monitored user activities prior to the search on the web site and after the search on the web site; and
  associate the user intent based on the monitored user activities prior to the search on the web site and after the search on the web site with the user query.

12. The system recited in claim 10, wherein the processor is further configured to:
  determine a user intent based on the monitored user activities prior to the search on the web site and after the search on the web site;
  associate the user intent based on the monitored user activities prior to the search on the web site and after the search on the web site with the user query; and
  determine a search result that is not relevant to the user intent based on the monitored user activities prior to the search on the web site and after the search on the web site.

13. The system of claim 1, wherein the recommendation further includes an identification of low performing categories displayed on the web site and an identification of poor performing products displayed on the web site.

14. The method of claim 4, wherein the recommendation further includes an identification of low performing categories displayed on the web site and an identification of poor performing products displayed on the web site.

15. The computer program product of claim 7, wherein the recommendation further includes an identification of low performing categories displayed on the web site and an identification of poor performing products displayed on the web site.

16. The system of claim 10, wherein the recommendation further includes an identification of low performing categories displayed on the web site and an identification of poor performing products displayed on the web site.

* * * * *